US012753029B2

(12) United States Patent
Henderson

(10) Patent No.: US 12,753,029 B2
(45) Date of Patent: Oct. 6, 2026

(54) REMOVABLE DELIVERY-VEHICLE DOCK PLATE

(71) Applicant: Federal Express Corporation, Memphis, TN (US)

(72) Inventor: Travis Henderson, Pittsburgh, PA (US)

(73) Assignee: Federal Express Corporation, Memphis, TN (US)

( * ) Notice: Subject to any disclaimer, the term of this patent is extended or adjusted under 35 U.S.C. 154(b) by 801 days.

(21) Appl. No.: 18/159,359

(22) Filed: Jan. 25, 2023

(65) Prior Publication Data

US 2024/0246783 A1 Jul. 25, 2024

(51) Int. Cl.
*B65G 69/30* (2006.01)

(52) U.S. Cl.
CPC .................................... *B65G 69/30* (2013.01)

(58) Field of Classification Search
CPC ................................ B65G 69/28; B65G 69/30
See application file for complete search history.

(56) References Cited

U.S. PATENT DOCUMENTS 2,337,138 A 12/1943 Berg
3,735,440 A * 5/1973 Hetmanski .............. E01D 15/24
14/71.1
D361,642 S 8/1995 Smith et al.
5,781,953 A 7/1998 Winter
D633,684 S 3/2011 Key
8,327,486 B2 12/2012 Fontaine et al.
8,413,280 B2 4/2013 Goin et al.
9,534,433 B2 1/2017 Elkasevic et al.
11,440,754 B2 * 9/2022 Bunker ................... F16B 45/00
11,577,923 B2 * 2/2023 Leum ..................... B65G 69/30
12,344,490 B2 * 7/2025 Bunker, II ............. B65G 69/30
2025/0066146 A1 * 2/2025 Krolski .................. B65G 69/30

* cited by examiner

*Primary Examiner* — Gary S Hartmann
(74) *Attorney, Agent, or Firm* — Fish & Richardson P.C.

(57) ABSTRACT

Methods and systems for utilizing a removable loading dock ramp system. One of the apparatus includes a platform having a first end, a second end opposite the first end, a top surface, and a bottom surface, the platform comprising at least one rod attached to the bottom surface at the first end; and a first bracket and a second bracket each attached to a storage structure, the first bracket comprising a first planar surface extending away from the storage structure and defining a hole, sized to accept the rod, through the first planar surface, the second bracket comprising a second planar surface extending away from the storage structure and defining a slot comprising an opening at an edge of the second planar surface, the slot sized to accept the rod such that the rod passes through the opening and rests at a bottom of the slot.

20 Claims, 27 Drawing Sheets

700

REMOVABLE DELIVERY-VEHICLE DOCK PLATE

TECHNICAL FIELD

The present specification relates to loading dock plates, and specifically to removable dock plates.

BACKGROUND

Dock plates are generally used to facilitate the loading or unloading of cargo from one container to another. In some implementations, these containers may be mobile vehicles, such as a van or trailer. Given that cargo vehicles can vary in size, there is no “standard” loading floor height, meaning that often there is an elevation change between the two containers where loading or unloading is to occur. Additionally, geometric constraints between the two containers may also force a degree of horizontal separation between the two loading areas. This vertical and horizontal separation creates tripping and falling hazards for personnel loading or unloading containers. Dock plates are generally used to minimize these hazards by “bridging the gap” between containers that have substantially different geometry. However, the limited mounting options for a dock plate on a container can occasionally result in a less-than-ideal grade between the two containers, either having a negligible impact on safety or creating a safety hazard itself. Further, dock plates must be stored when not in use, requiring personnel to assemble and disassemble the apparatus every time a loading or unloading operation is to occur. These inconveniences mean that personnel are sometimes incentivized to not utilize a dock plate, or to do so in a way that is improper. Additionally, improperly installed dock plates, or dock plates installed at certain angles relative to the direction of loading, may come loose, creating an additional safety hazard for personnel.

SUMMARY

In general, the present disclosure relates to loading dock plates, and specifically to removable dock plates.

In general, innovative aspects of the subject matter described in this specification can be embodied in a loading dock ramp system that includes a platform having a first end, a second end opposite the first end, a top surface, and a bottom surface, the platform including at least one rod attached to the bottom surface at the first end; and a first bracket and a second bracket each attached to a storage structure, the first bracket including a first planar surface extending away from the storage structure and defining a hole, sized to accept the rod, through the first planar surface, and the second bracket including a second planar surface extending away from the storage structure and defining a slot including an opening at an edge of the second planar surface, the slot sized to accept the rod such that the rod passes through the opening and rests at a bottom of the slot.

Other implementations of this loading dock ramp system include a platform having a first end, a second end opposite the first end, a top surface, and a bottom surface, the platform including at least one rod attached to the bottom surface at the first end; and a first bracket and a second bracket, the first bracket including a first planar surface extending away from a first base member and defining a hole, sized to accept the rod, through the first planar surface, the second bracket including a second planar surface extending away from a second base member and defining a slot including an opening at an edge of the second planar surface, the slot sized to accept the rod such that the rod passes through the opening and rests at a bottom of the slot, wherein the first base member and the second base member are each configured for attachment to a storage structure.

Other implementations of this loading dock ramp system include a platform having a first end, a second end opposite the first end, a top surface, and a bottom surface, the platform comprising at least one angular tab attached to the bottom surface at the first end and extending away from the bottom surface; and a bracket attached to a storage structure, the bracket comprising a planar surface extending away from the storage structure and defining at least one slot, sized to accept the at least one angular tab, through the planar surface.

The foregoing and other implementations can each optionally include one or more of the following features, alone or in combination.

In some implementations, the rod is a solid cylindrical rod extending across the first end of the platform and extending as far as or beyond opposite side edges of the platform.

In some implementations, the at least one rod includes: a first rod extending partially along the first end of the platform and beyond a first side edge of the platform, and a second rod extending partially along the first end of the platform and beyond a second side edge of the platform opposite the first side edge.

In some implementations, the storage structure is a mobile storage structure.

In some implementations, the first bracket includes a first base and the first planar surface extends outward from the first base, and the second bracket includes a second base and the second planar surface extends outward from the second base. In some cases, the first bracket includes a first reinforcement member along a side edge of the first planar surface, and the second bracket includes a second reinforcement member along a side edge of the second planar surface. In some cases, the opening at the edge of the second planar surface is positioned facing away from the second reinforcement member. In some cases, the slot is oriented such that the bottom of the slot is closer to the second reinforcement member than the opening is to the second reinforcement member.

In some implementations, the top surface at the second end of the platform is angled downward.

In some implementations, the top surface of the platform is angled upward along two sides extending between the first end and the second end.

In some implementations, the slot is oriented such that the bottom of the slot is offset horizontally from the opening at the edge of the second planar surface.

In some implementations, the rod is configured to engage with the first bracket and the second bracket such that the platform can pivot about the rod.

In some implementations, the platform is tapered at the second end.

In some implementations, the top surface of the platform includes a trapezoidal shape with the first end being longer than the second end.

In some implementations, the first base member and the second base member each define a plurality of holes each sized to accept a mechanical fastener.

In some implementations, the loading dock plate apparatus can be installed without the use of tools.

In some implementations, the at least one angular tab includes a rounded corner configured to engage with the bracket, such that the platform is capable of being pivoted about the rounded corner when the platform is mounted to the bracket.

In some implementations, the at least one angular tab includes a solid member an L-shaped cross section with a, one side of the member being notched along a length of the member to form a plurality of angular tabs along a length of the member.

In general, innovative aspects of the subject matter described in this specification can be embodied in a method including mounting a first and second bracket to a storage structure, the first bracket including a first planar surface extending away from the storage structure and defining a hole, sized to accept a rod, through the first planar surface, and the second bracket including a second planar surface extending away from the storage structure and defining a slot; attaching a rod, suitable to engage with the first and second brackets, to the bottom surface of a platform; inserting the rod into the first bracket hole; and inserting the rod into the slot of the second bracket; and, pivoting the platform about the rod on the first and second brackets to establish a path across the platform to the storage structure.

Other implementations of this method include mounting a bracket to a storage structure, the bracket including a first planar surface extending away from the storage structure and defining at least one slot, sized to accept at least one angular tab, through the first planar surface; attaching at least one angular tab, suitable to engage with the slots of the first bracket, to the bottom surface of a platform; inserting the angular tabs into the first bracket slots; and, pivoting the platform about a rounded corner on the tabs and on the first bracket to establish a path across the platform to the storage structure.

Particular implementations of the subject matter described in this specification can be implemented so as to realize one or more of the following advantages. Implementations may improve safety or satisfy workplace safety requirements, improve compliance with safety equipment, reduce the dock plate breakdown or setup time, improve dock plate ease of use, extend the horizontal distance over which loading can be conducted, extend the amount or type of containers the dock plate may integrate with, or enable ease of transport for the dock plate while meeting legal transportation requirements.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Dock plates are rigid structures used to minimize personnel tripping and falling hazards when moving cargo between different cargo containers. One example use of a dock plate includes the loading of cargo into a delivery van from a mobile loading dock. In this scenario, the delivery van has a different cargo floor height than the mobile loading dock, creating an elevation difference between the two structures. Geometric constraints may also require that the commercial van have a certain amount of horizontal separation from the mobile loading dock. A dock plate would be used by personnel in this case to create a safe pathway to load cargo from the mobile loading dock into the commercial van.

Cargo loading operations include the moving objects or goods from one container to another. While “cargo loading” or “moving” may be used throughout this specification to describe the movement of cargo, it should be understood that these terms do not imply one specific direction of travel between containers. These terms encompass both the loading and unloading of cargo both to and from containers, platforms, or vehicles in the cargo loading operation. Additionally, “cargo loading” or “moving” does not imply a specific container type or application, unless otherwise noted.

Figure 6:
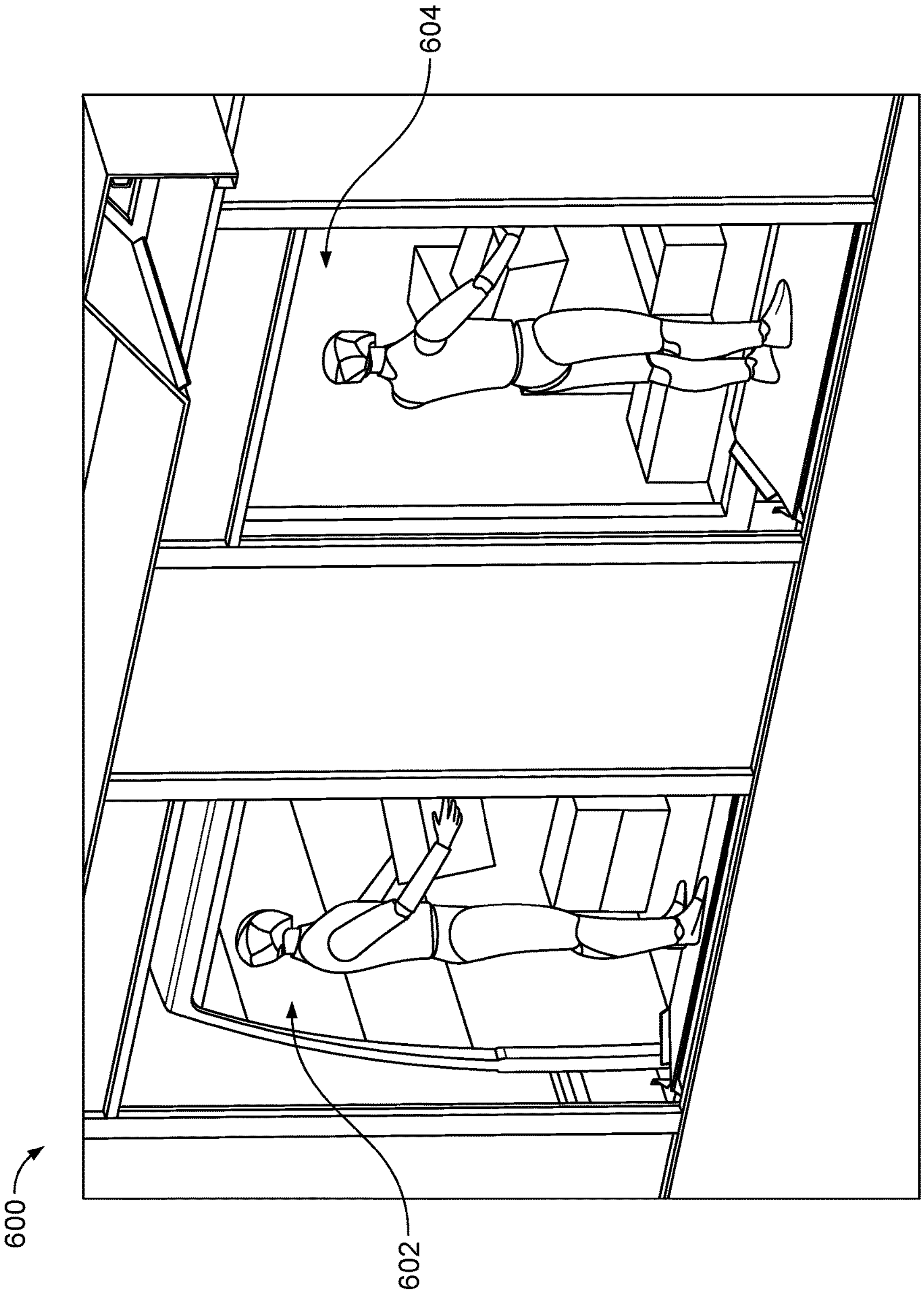
FIG. 6 is a diagram of example loading vehicles that may utilize the dock plate.

In some cases, cargo loading may be conducted across a large variety of cargo docks and commercial vehicles, each with different geometric configurations and cargo floor heights. To that end, dock plates can be configured such that they are functional with a large range of vehicles and loading structures. Example vehicles that could utilize dock plates include: straight trucks, step vans (i.e. walk-in vans), cargo vans, trailers, panel vans, ships, boats, or aircraft. These vehicles may be of differing size, such that there may be more than one type of "straight-truck" that requires a dock plate. It may also be desirable to utilize a dock plate in other vehicle types not listed above. FIG. 6 shows example vehicles that may use the dock plate described in this specification. In addition to vehicles, cargo loading may also be conducted in combination with a fixed, or semi-permanent, structure. These structures can include mobile loading docks, containers, or fixed loading docks. Similar to the vehicles above, there may more than one type of each of these fixed structures. It may also be desirable to utilize a dock plate with other fixed, or semi-permanent, structures not listed above. FIG. 7 shows an example semi-permanent loading structure that may use the dock plate described in this specification. In the case where there are a large number of possible vehicles and structures, it may be advantageous to have a dock plate that is functional across the range of possible vehicles and structures. This flexibility would negate the need to have custom dock plates for each possible loading operation.

In some implementations, the dock plate is a removable structure. For example, the dock plate can be installed and uninstalled efficiently. In some cases, when removed, the dock plate is stored in one of the vehicles that was involved in the cargo loading operation. In this case, the dock plate should be stored in the vehicle in such a way that it does not become a hazard while the vehicle is in operation.

In some implementations, the dock plate prevents excessive movement during the cargo loading operation. This movement can result from the forces imparted by personnel traveling across the mounted dock plate. Movement of the dock plate could cause the dock plate to become dislodged, creating a tripping or falling hazard. In some cases, the dock plate is mounted in such a way that the risk of excess movement of the dock plate is minimized. In some cases, this mounting can be done in such a way that the dock plate can still be installed and uninstalled efficiently by personnel. For example, some implementations of the dock plate can be installed and removed by a single person.

The present disclosure relates to a dock plate apparatus that is compatible with a large range of vehicles and loading structures, one that can be installed and uninstalled efficiently and stored safely in a road-going vehicle. Additionally, the mounting hardware of this dock plate apparatus prevents excessive movement of the dock plate during the cargo loading operation while still allowing efficient assembly and disassembly.

Figure 1:
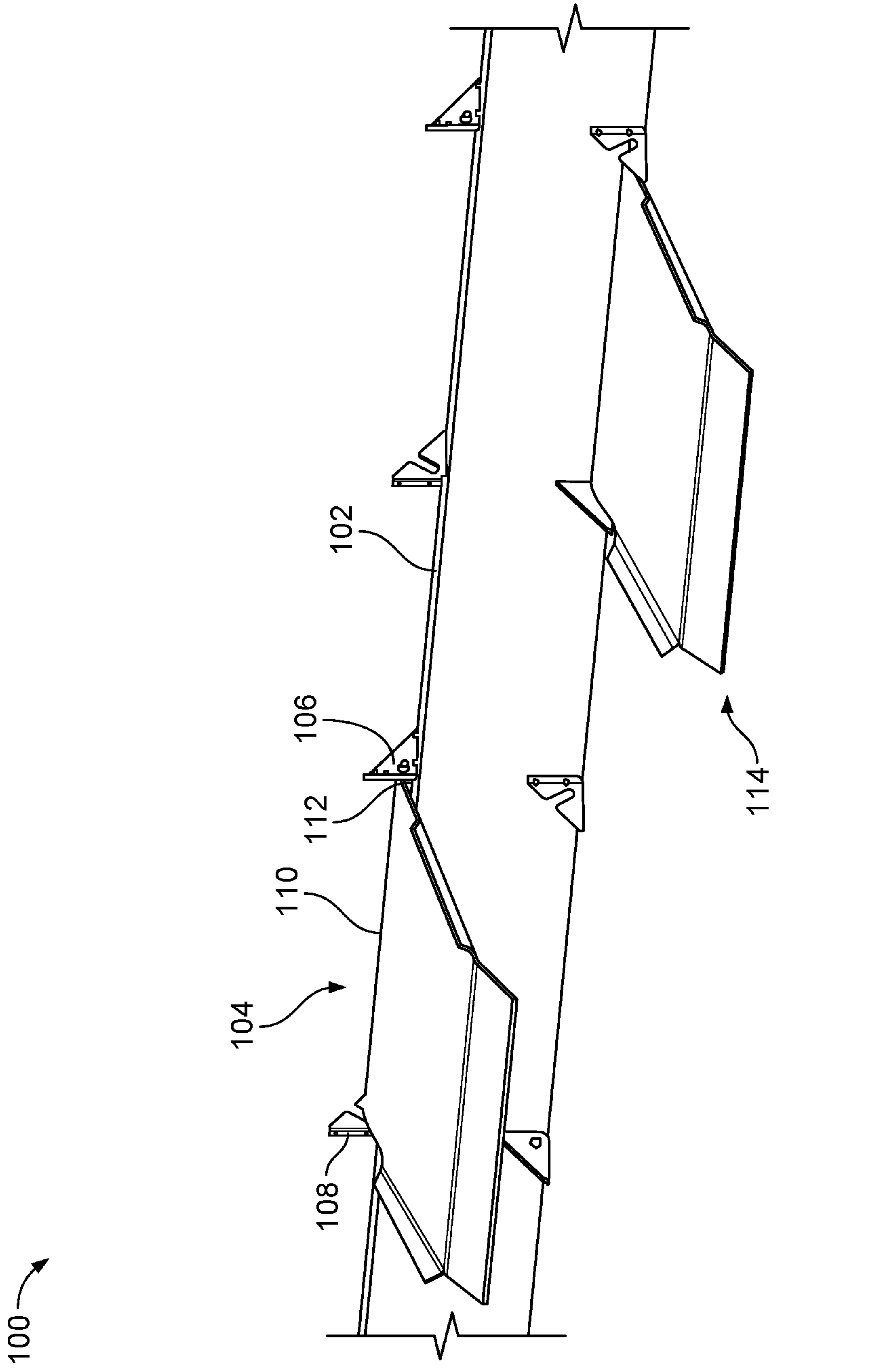
FIG. 1 is a diagram of an example dock plate installed on a container structure.

FIG. 1 is a diagram 100 of an example dock plate 104 installed on a container structure 102 (e.g., a fixed or mobile loading dock). In this implementation, the dock plate 104 includes a platform 110, and a rod 112 that extends past each side of the platform 110. The platform 110 forms a bridge between the container structure 102 and the cargo bay of a vehicle. The rod 112 engages with brackets 106 and 108 to secure the dock plate 104 to a container structure 102. The platform 110 can pivot about the rod 112 to adjust to different height cargo vehicles.

The dock plate 104 attaches to the container structure 102 by brackets 106 and 108. The brackets 106 and 108 can be mounted to various locations on the loading structure 102. For example, the brackets 106 and 108 can be mounted to the top surface of the loading structure 102 or along the side of the structure 102. Brackets 106 and 108 can be attached to the structure 102 with a variety of hardware including, but not limited to, screws, bolts, nails, and other permanent or temporary means of affixing two surfaces. In another implementation shown on the right, brackets 106 and 108 are mounted on the side of the loading structure 102. In some implementations, the container structure 102 may have multiple sets of brackets 106 and 108 mounted at different positions (as shown), to allow for the dock plate 104 to be mounted at different heights.

Some implementations can employ multiple rods 112 to facilitate attachment of the platform 110 to the brackets 106 and 108. For example, the platform 110 may have two rods (not shown), each one connected on opposite ends of the platform 110, designed to engage with the brackets such that one rod engages the first bracket 106 while the other rod engages the second bracket 108.

FIG. 2 is a diagram of an example dock plate platform 110. This example dock plate platform 110 includes a textured loading surface 201, side flanges 202, a first planar surface 204, a second planar surface 206, and a rod mounting structure 208. FIG. 3 is a diagram of an example rotated dock plate 104 installed on a loading structure.

In some implementations, the dock plate 104 may utilize a single rod 112 to connect the platform to the first 106 and second 108 brackets. In some implementations, when the platform 110 is attached to the brackets 106 and 108 with the rod 112, the platform 110 is allowed to pivot about the rod 112. This pivoting movement allows the platform 110 to be rotated to from a loading surface between two cargo areas of differing height.

Figure 2A:
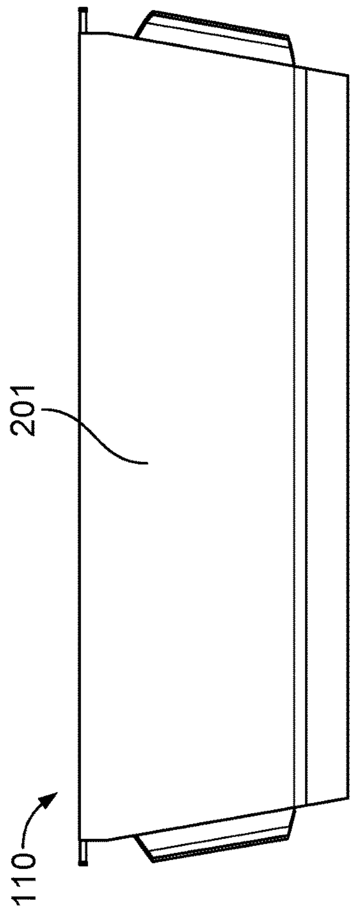
FIG. 2A is a diagram of an example dock plate platform top view.
Figure 3:
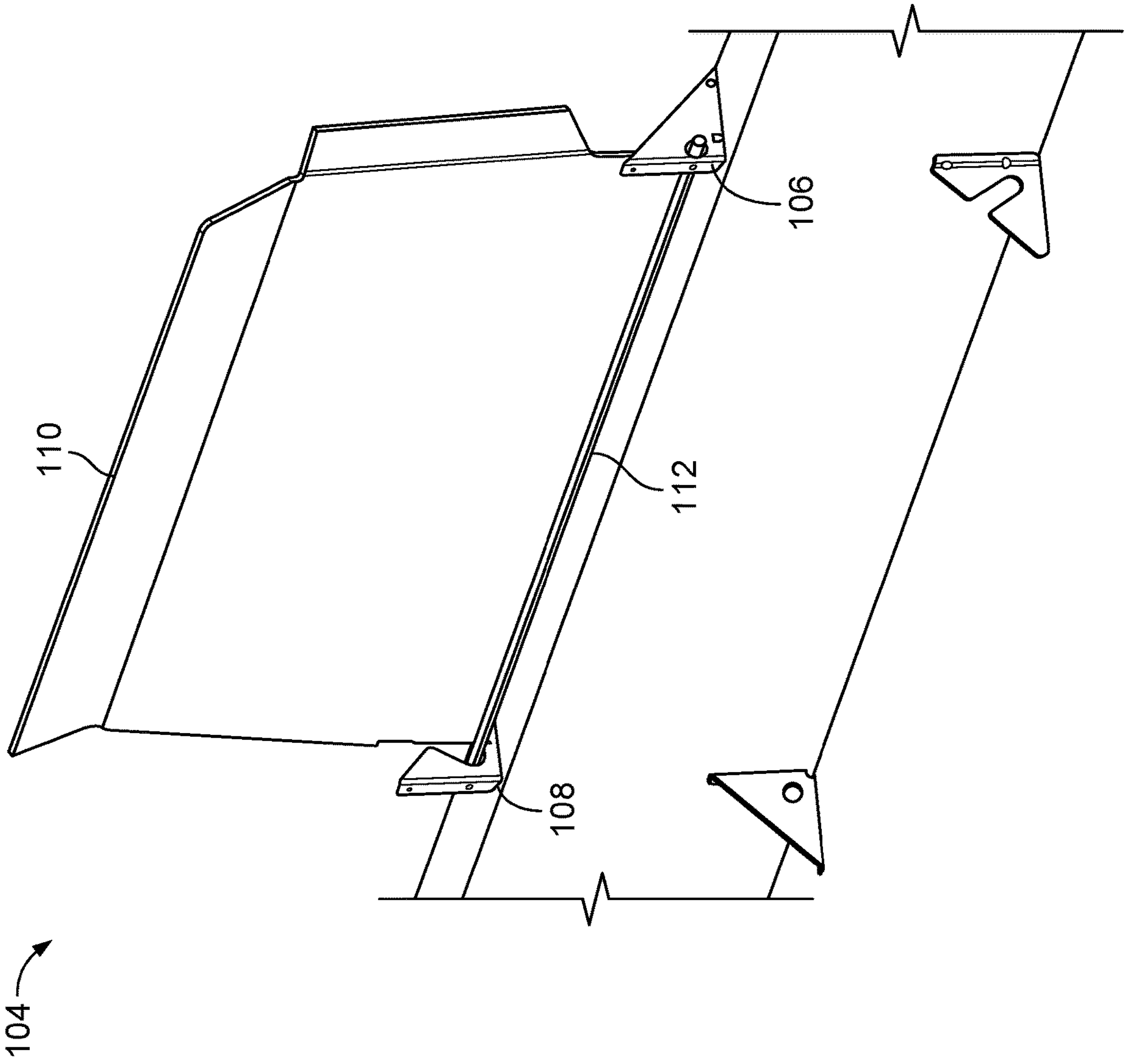
FIG. 3 is a diagram of an example rotated dock plate installed on a container structure.

FIG. 2A is a diagram of an example dock plate platform 110 top view. In some implementations, the surface of the platform across which loading is expected to occur is textured. For example, the textured loading surface 201 may include a "diamond-plate" pattern, such that personnel walking across the surface have additional grip. This additional grip can prevent personnel tripping and falling hazards. Other implementations may afford more grip in certain applications. For example, a situation that may require more grip could be an implementation where the dock plate surfaces are expected to be frequently wetted, for example, in maritime applications. Alternatively, in some cases, it may be appropriate for the loading surface of platform 110 to have no additional texture.

The platform 110 is constructed of a rigid material that can support the weight of several personnel including, but not limited to, steel, aluminum, wood, or a composite material. In some implementations, platform is designed with a material such that the weight of platform 110 can be lifted by a single person.

Figure 2B:
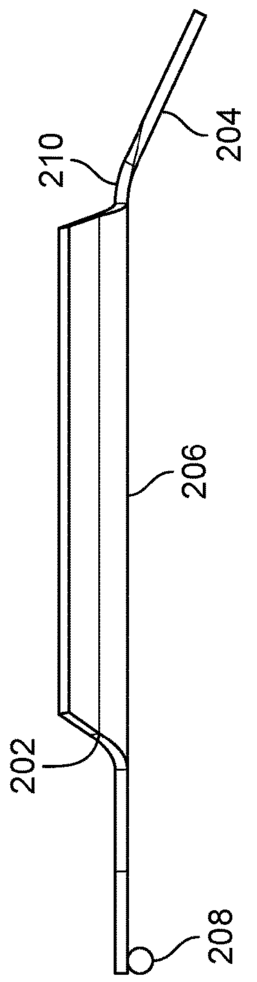
FIG. 2B is a diagram of an example dock plate platform side view.

FIG. 2B is a diagram of an example dock plate platform 110 side view. In some implementations, the side edges of platform 110 can be fitted with angled flanges 202. These flanges 202 may aide personnel in detecting when they are reaching the side of platform 110, for example, if they are carrying a large object that obscures their vision. In some cases, the edges of flanges 202 may be rounded or angled such that they do not create a tripping hazard themselves. In some cases, the angle of flanges 202 relative to the textured surface 201 may be a specific value, for example 60 degrees with a ⅜ inch bend radius. In some cases, the flanges 202 also increase the structural integrity of the platform 110.

This increased structural integrity allows less material to be used in the construction of platform 110, leading to a lighter overall platform 110 weight.

In some implementations, portions of the platform 110 are angled such that when the platform 110 is lowered against the cargo loading area the vertical separation of the platform 110 and cargo loading area is as small as possible. This vertical separation between the loading dock and cargo loading surfaces can form a tripping hazard for personnel. For example, FIG. 7 illustrates that a vehicle 704 may have a substantially higher cargo floor than a mobile loading structure 702. In some implementations, the platform 110 may include multiple planar surfaces formed by bends 210 in the material. For example, the platform may have a single bend 210 of 25 degrees that forms planar surfaces 204 and 206. In some cases, the angle of bend 210 may be computed by averaging the ideal angle for a variety of loading structures and vehicles. In some implementations, the lengths and widths of planar surfaces 204 and 206 may be designed in a similar manner. For example, planar surface 206 may have a length of 16.5 inches, while planar surface 204 may have a length of 4.0 inches.

In some implementations, planar surfaces 204 and 206 may also be tapered in a given direction. For example, planar surface 206 is tapered at 35 degrees along the direction of loading. In some cases, the values of these angles are determined by a process similar to what is described above. In some cases, planar surfaces 204 and 206 may be tapered such that the platform 110 is trapezoidal.

In some implementations, the dock plate platform 110 can rotate about the rod 112 and brackets 106 and 108. This rotation can allow the dock plate 104 to be compatible with a larger range of vehicles and loading structures. In some cases, this rotation can be performed manually by simply moving the dock plate platform 110 into the desired position by hand.

Figure 2C:
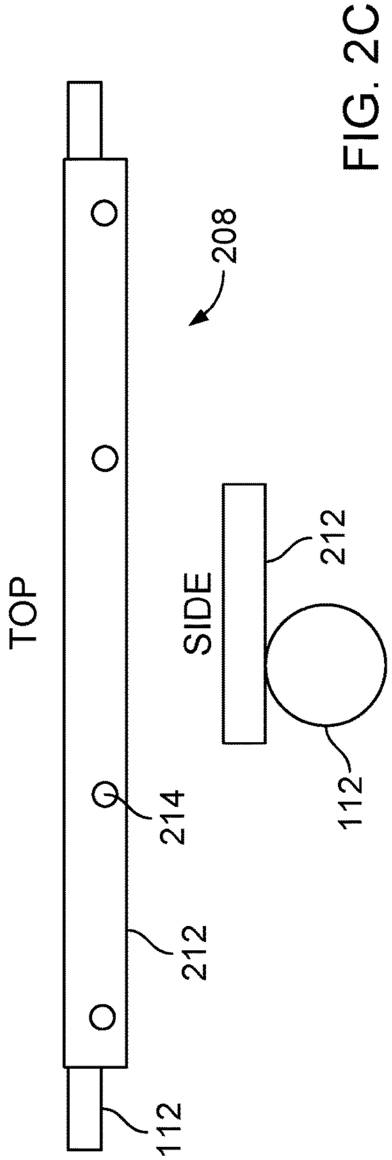
FIG. 2C is a diagram of an example dock plate platform rod mounting structure top and side view.

FIG. 2C is a diagram of an example dock plate platform 110 rod mounting structure top and side view. In some implementations, platform 110 can include a rod mounting structure 208. Rod mounting structure 208 is used to attach the rod 112 to the platform 110. In some implementations, the rod mounting structure 208 can include the rod 112, a mounting plate 212, and one or more hardware mounting points 214. In this case, rod 112 may be welded to plate 212, and the combination of the rod 112 and plate 212 may be attached to the platform 110 by the use of the hardware mounting points 214. Suitable hardware can be used with the hardware mounting points 214 to attach the rod mounting structure 208 to the platform 110, including, but not limited to, screws, rivets, or bolts. In order to facilitate the ability to install the dock plate 104 without tools, the dock plate 104 can be stored such that the rod mounting structure 208 is already affixed to the platform 110. In other implementations, the rod 112 can be welded directly to the bottom surface of the platform 110.

Figure 4:
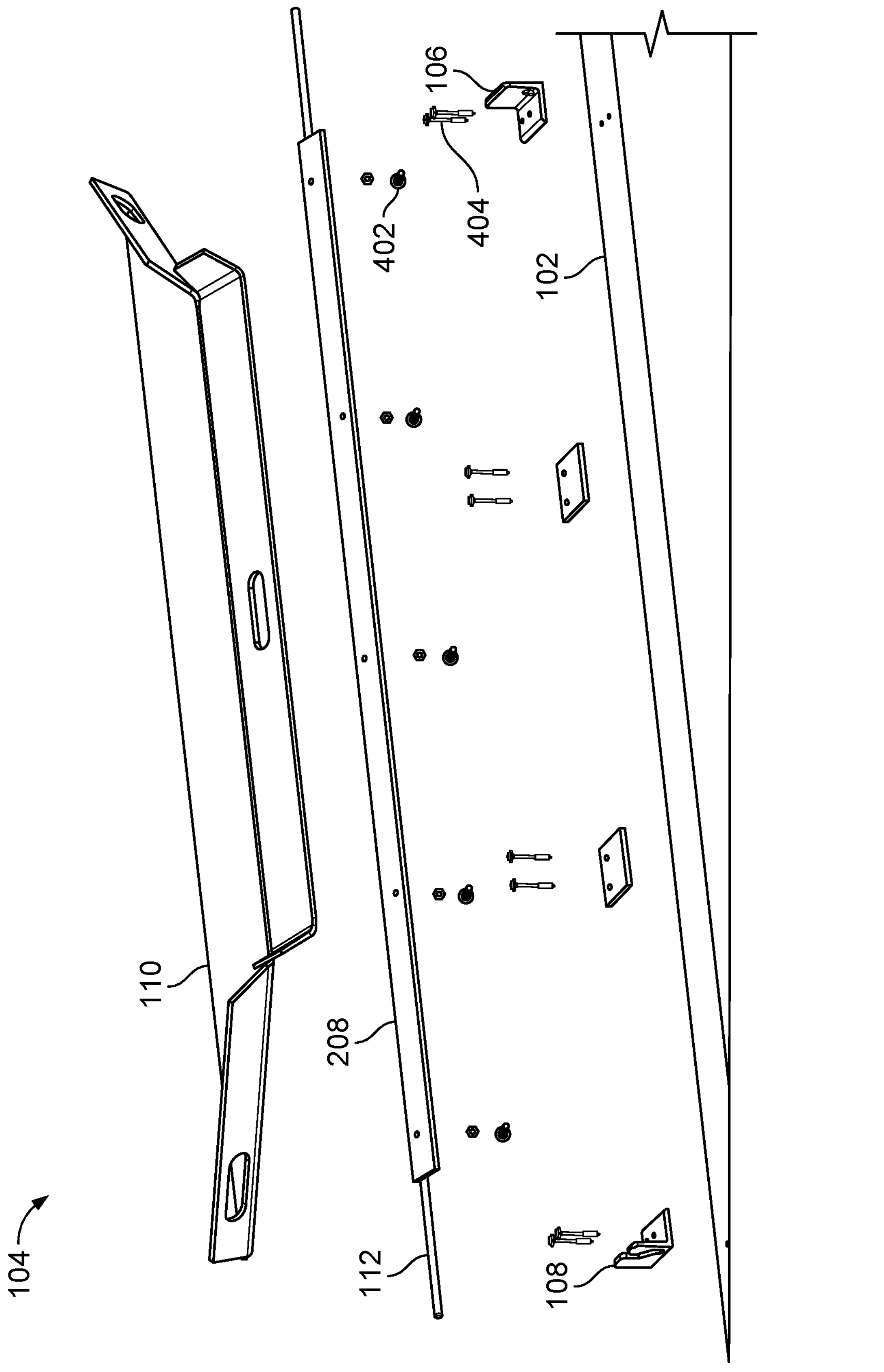
FIG. 4 is an exploded view of an example dock plate.

FIG. 4 is an exploded view of an example dock plate. This example exploded view includes a dock plate platform 110, rod 112, rod mounting structure 208, screws 402, brackets 106 and 108, fasteners 404, and loading structure 102.

In some implementations, the dock plate platform 110 can be installed into brackets 106 and 108 without the use of tools. For example, the rod 112 can be inserted by hand into the hole of bracket 106 and slot of bracket 108, thereby mounting the dock plate platform 110 in the brackets. While one type of bracket and hardware is presented in this figure, it should be understood that there are multiple bracket are hardware choices, such as the additional examples defined above.

Figure 5A:
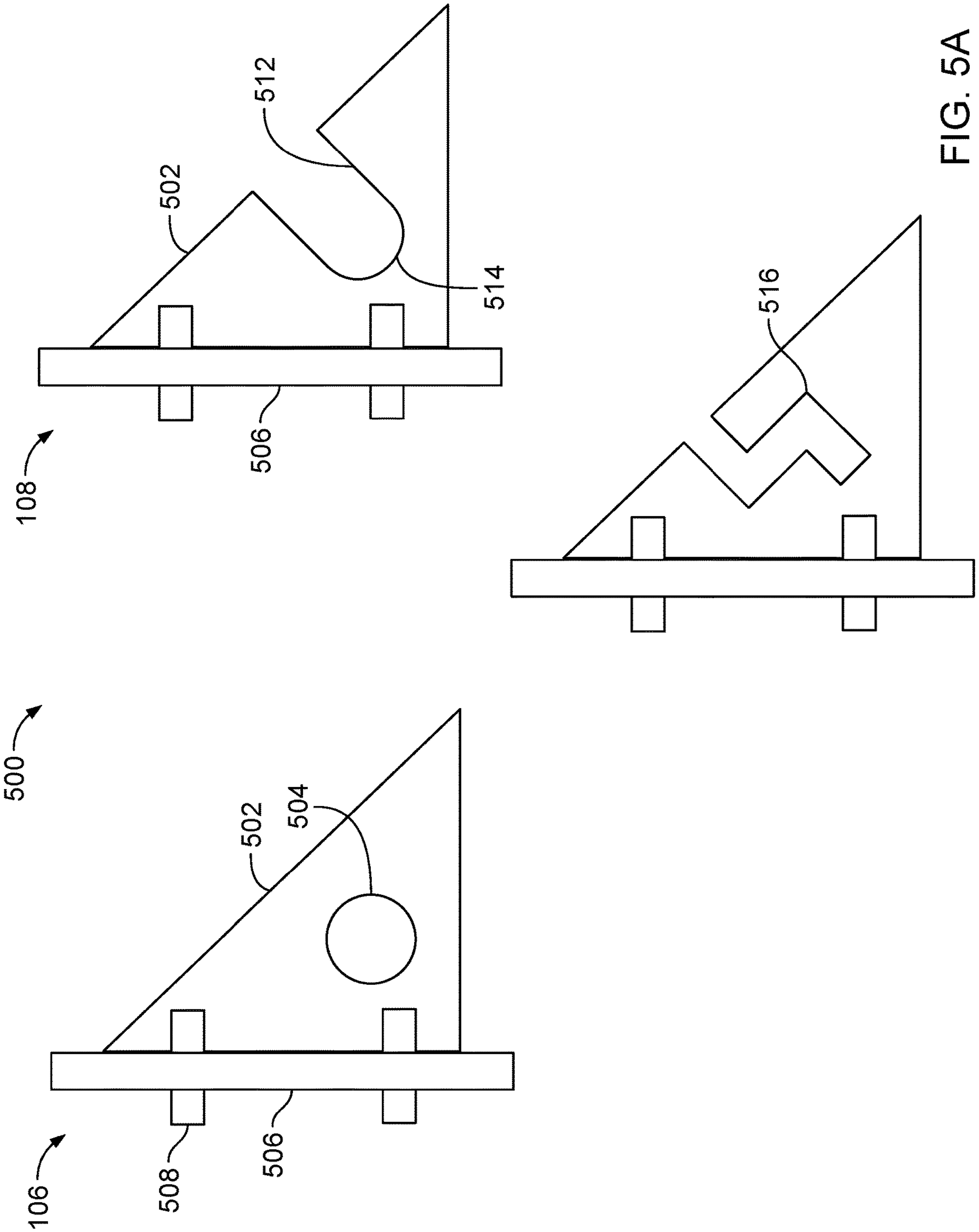
FIGS. 5A-5E depict is a diagrams showing various views of example first and second brackets associated with the dock plate.
Figure 5B:
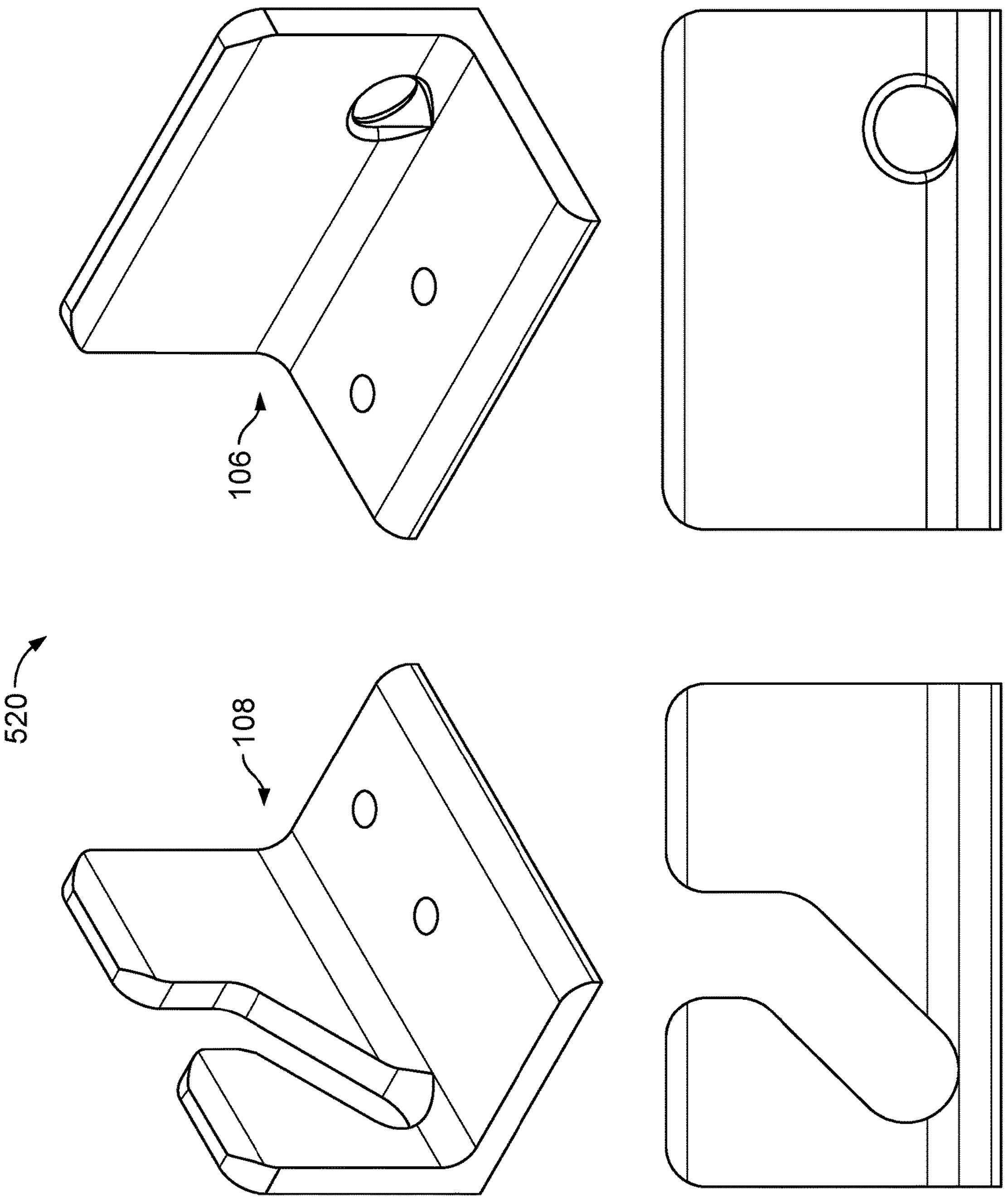

FIGS. 5A and 5B depict diagrams 500, 520 of example first 106 and second 108 brackets associated with the dock plate apparatus. In some implementations, the one or more brackets include a first bracket 106 and a second bracket 108 that vary in construction. For example, first bracket 106 may include a cylindrical hole 504 while second bracket 108 includes a slot 512. These features are sized appropriately, such as to enable the bracket to engage with the dock plate components. In some cases, this component is the rod 112 (not shown). In this case, hole 504 and slot 512 are sized such that the dock plate rod 112 can be inserted.

Figure 5C:
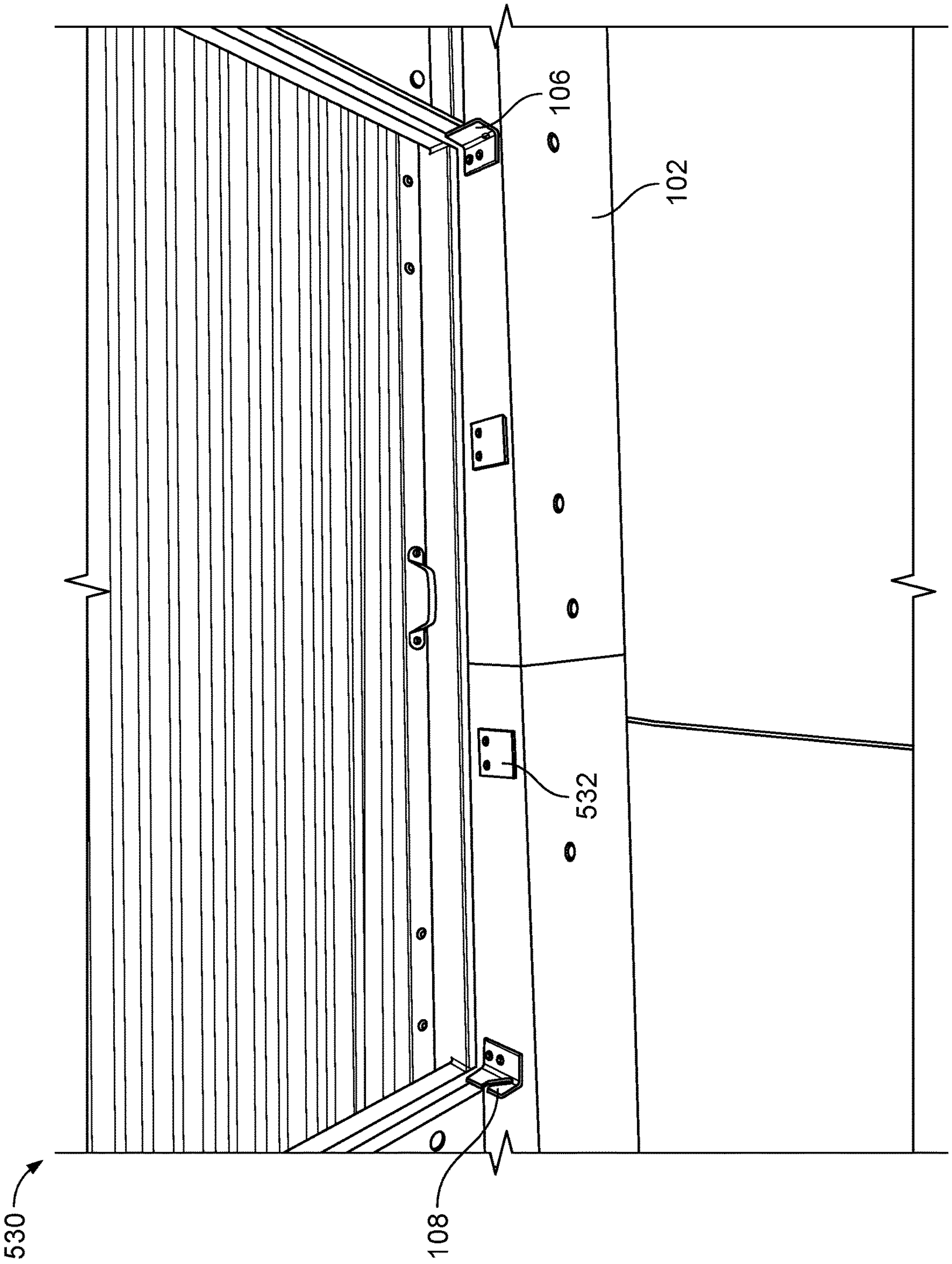

FIG. 5C is a diagram 530 of the example first 106 and second brackets 108 installed on an example loading structure 102. In some implementations, additional contact plates 532 can be installed on the mobile loading structure 102 to prevent the rod 112 from bending unacceptably under the weight of loading. In some cases, unacceptable bending of rod 112 can contribute to material fatigue and eventual failure of rod 112. In some implementations, contact plates 532 can also be installed to protect the features of the loading structure 102.

Figure 5D:
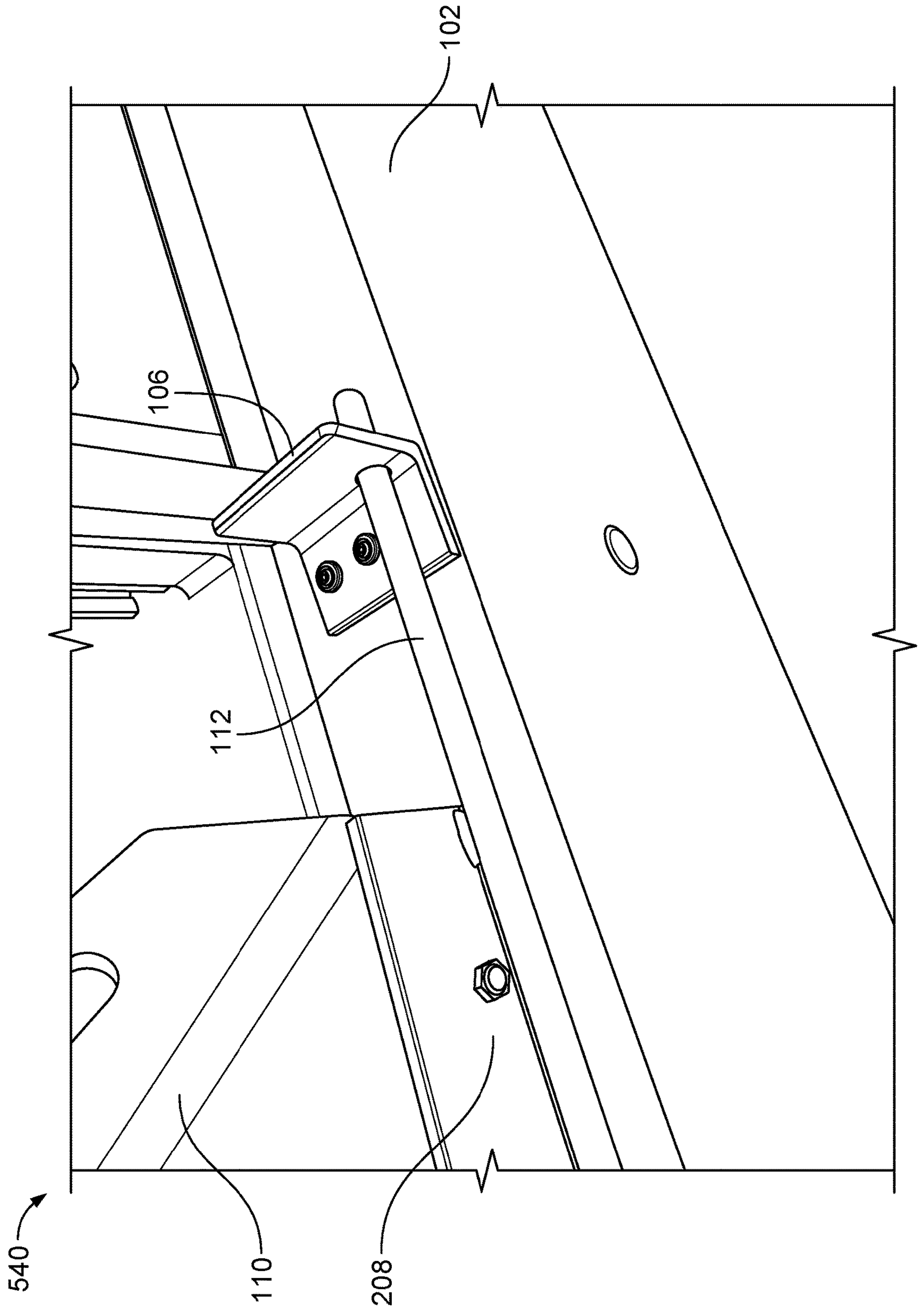

FIG. 5D is a close up view 540 of an example first bracket 106 installed on an example loading structure 102. Also shown in the close up view is rod 112, rod mounting structure 208, and platform 110.

Figure 5E:
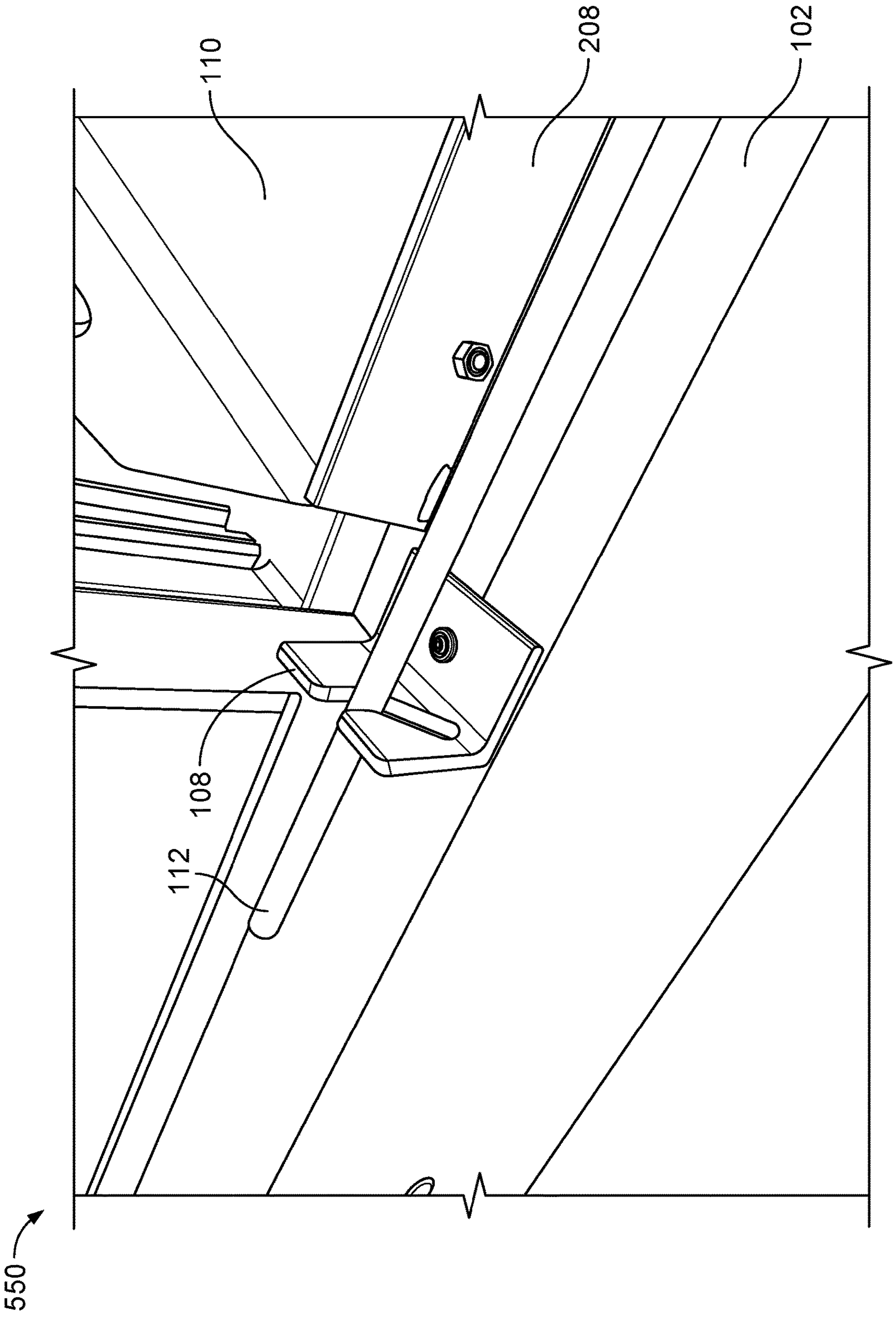

FIG. 5E is a close up view 550 of an example second bracket 108 installed on an example loading structure 102. Also shown in the close up view is rod 112, rod mounting structure 208, and platform 110.

In some implementations, brackets 106 and 108 include a member perpendicular to the mounting surface ("planar surface") 502, a member parallel to the mounting surface ("reinforcement member") 506, and one or more pieces of mounting hardware 508 that allow the attachment of the bracket to a loading structure (not shown).

In some implementations, slot 512 is a channel of parallel sides, facing away from the reinforcement member 506, with a cylindrical bottom resting area 514 in which the rod is designed to sit. In some cases, the bottom of this slot 512 is closer to the reinforcement member 506 than the opening is to the reinforcement member 506. In some cases, the bottom of the slot 512 is offset horizontally from the slot 512 opening. Other implementations of slot 512 may be used. For example, in implementations where the dock plate is to be expected to be routinely subjected to high shock events, slot 512 can include multiple bends 516 in its channel. These features would prevent a singular motion or force from removing the rod 112 (not shown) from the slot 512, and reduce the likelihood that a shock event would dislodge the rod 112.

In some implementations, the reinforcement member 506 contains holes that accept one or more pieces of mounting hardware 508. This mounting hardware 508 can be used to affix brackets 106 and 108 to the loading surface (not shown) upon which the dock plate is to be mounted. In some cases, mounting hardware 508 may be installed through one or more holes or features in planar surface 506. For example, planar surface 506 may have four drilled holes through which four bolts can be used to affix the bracket 106 to the loading surface. Other implementations of suitable mounting hardware 508 could be screws, nails, rivets, or other rigid fasteners. Additionally, in some implementations, mounting hardware 508 may be directly integrated into reinforcement member 506, for example, a welded stud.

In some implementations, bracket 108 is mounted such that the opening of the slot faces away from the opposite end of the platform 110. By positioning the second bracket 108 in this way, the forces imparted by the personnel traversing the platform 110 will not force the rod 112 out of the second bracket slot 108, preventing the dock plate 104 from becoming dislodged. In some implementations, brackets 106 and 108 and platform 110 can be oriented in a different way. For example, the second bracket 108 can be mounted such that the slot opening faces the opposite end of platform 110, if the forces expected to be exerted on platform 110 are to be from another direction that may cause platform 110 to become dislodged if they were mounted as shown in the figure.

While certain features of brackets 106 and 108 have been illustrated relative to one another, for example, the length of perpendicular member 502 relative to the diameter of hole 504, it should be understood that there are no geometric constraints for the features of brackets 106 and 108, unless otherwise noted.

FIG. 6 is a diagram 600 of example loading vehicles that may utilize the dock plate. In some implementations, these vehicles include step-vans 602 and straight-trucks 604. Other vehicles are compatible with the dock plate as discussed above.

Figure 7A:
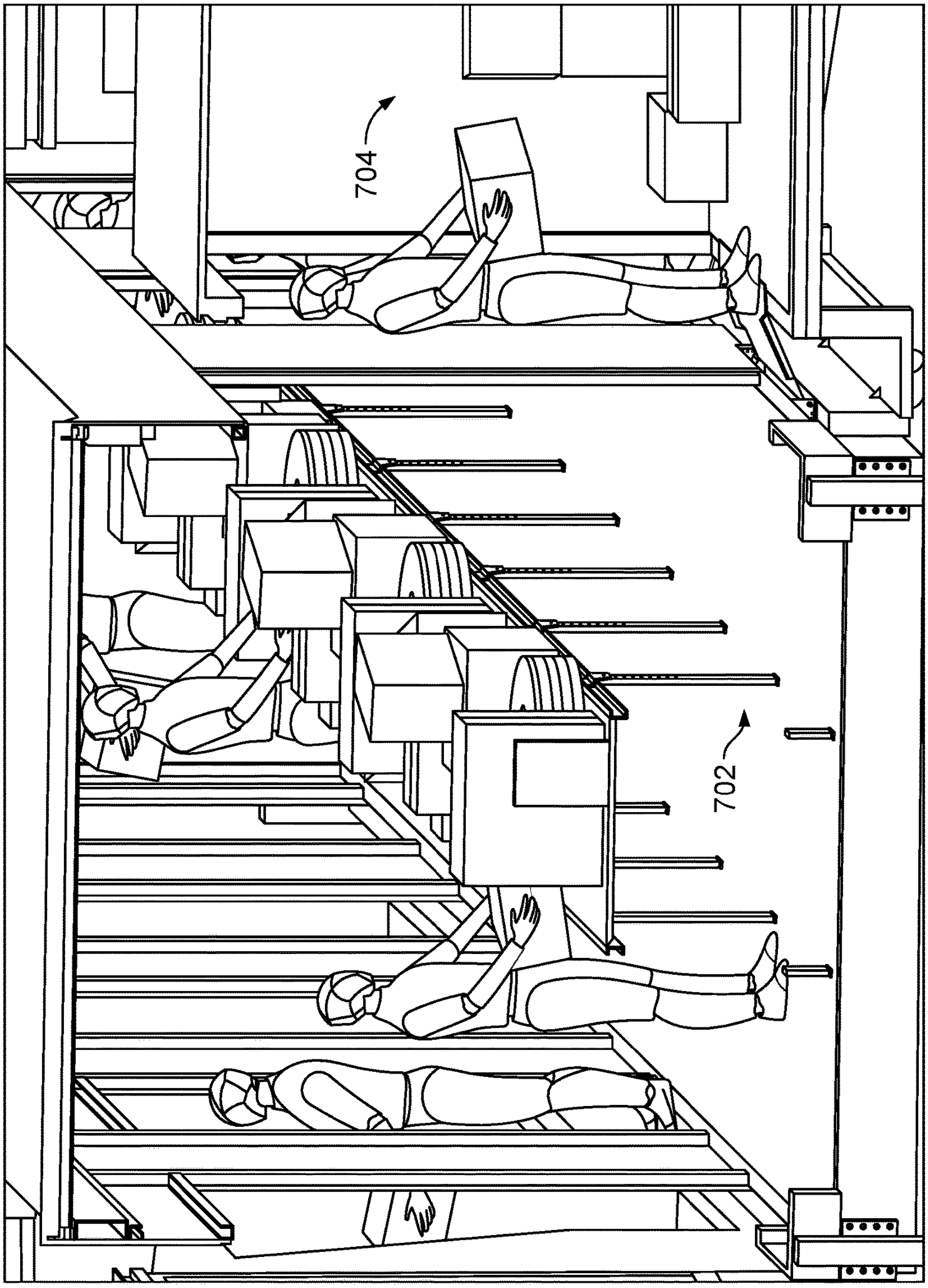
FIGS. 7A-7C are diagrams of an example mobile loading structure utilizing the dock plate with a vehicle.
Figure 7B:
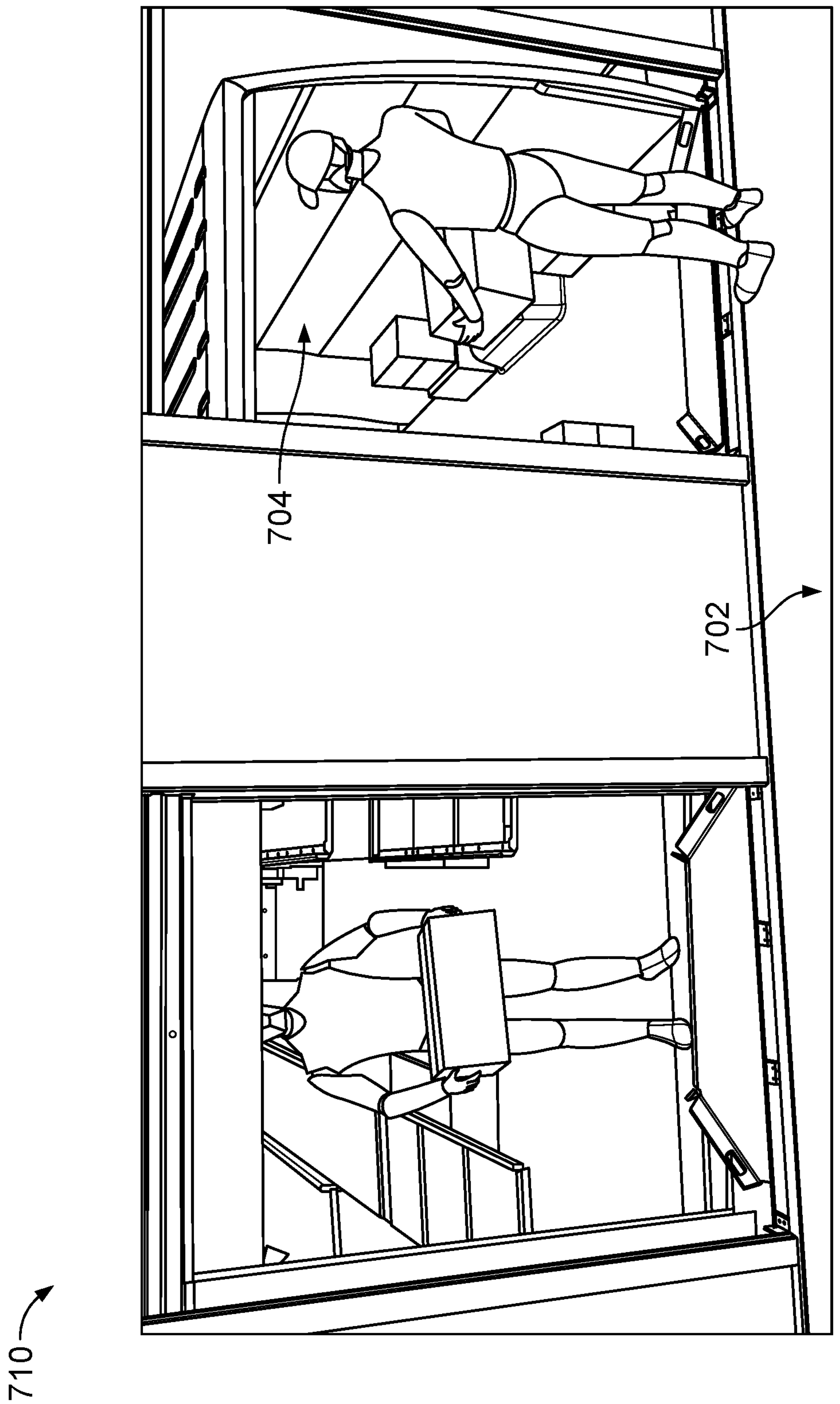
Figure 7C:
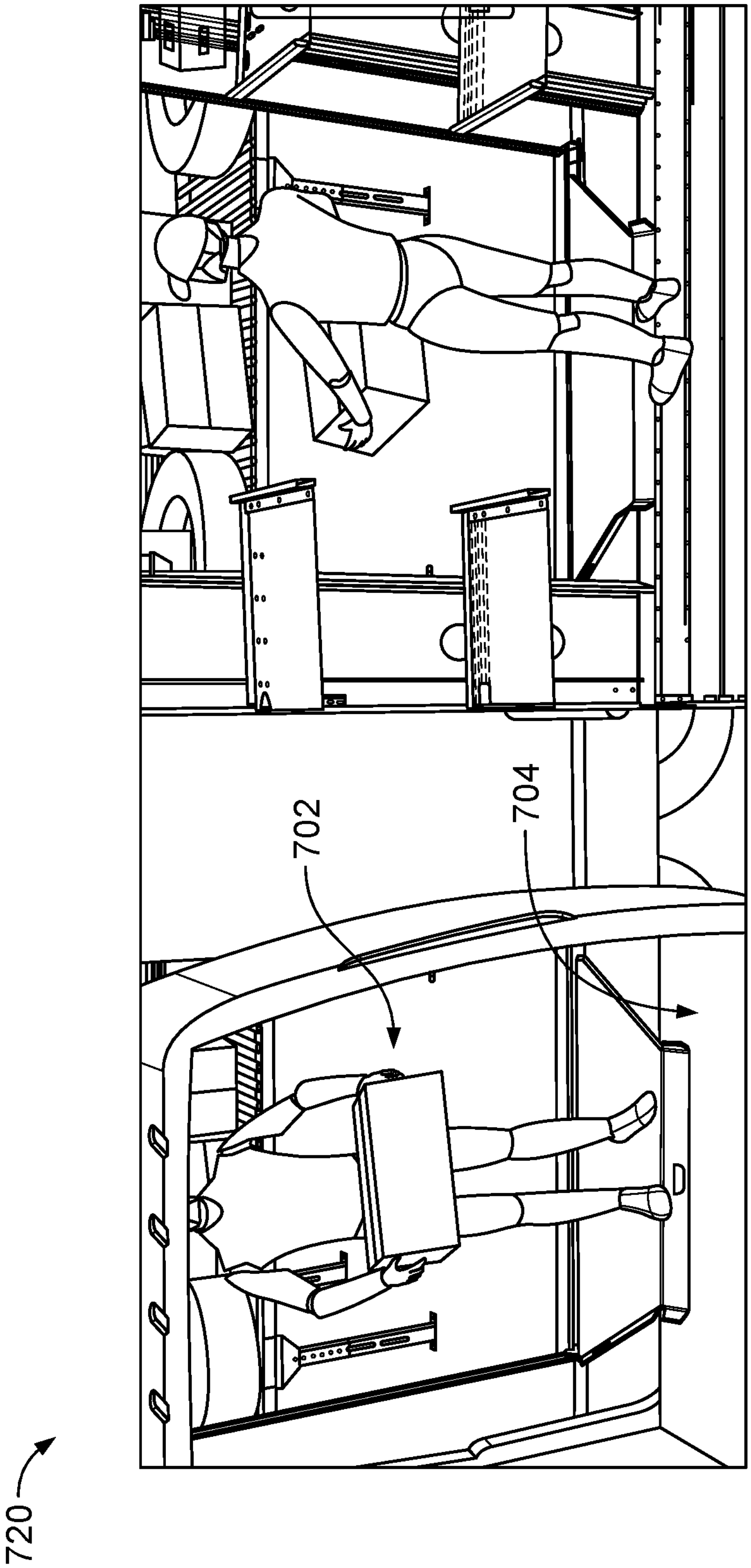
Figure 8A:
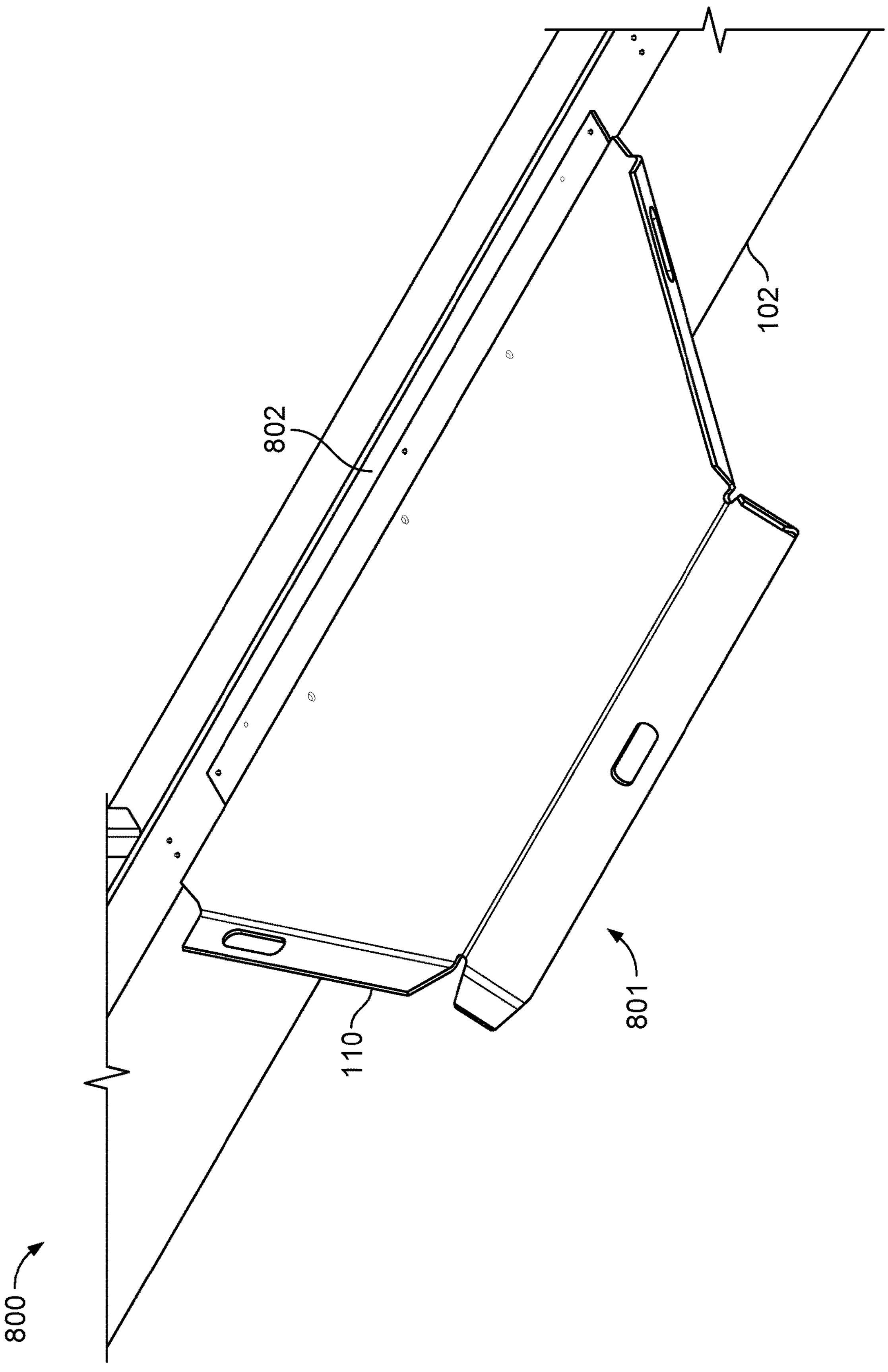
FIGS. 8A-8D depict diagrams showing various views of a second implementation of a dock plate installed on a loading structure.
Figure 8B:
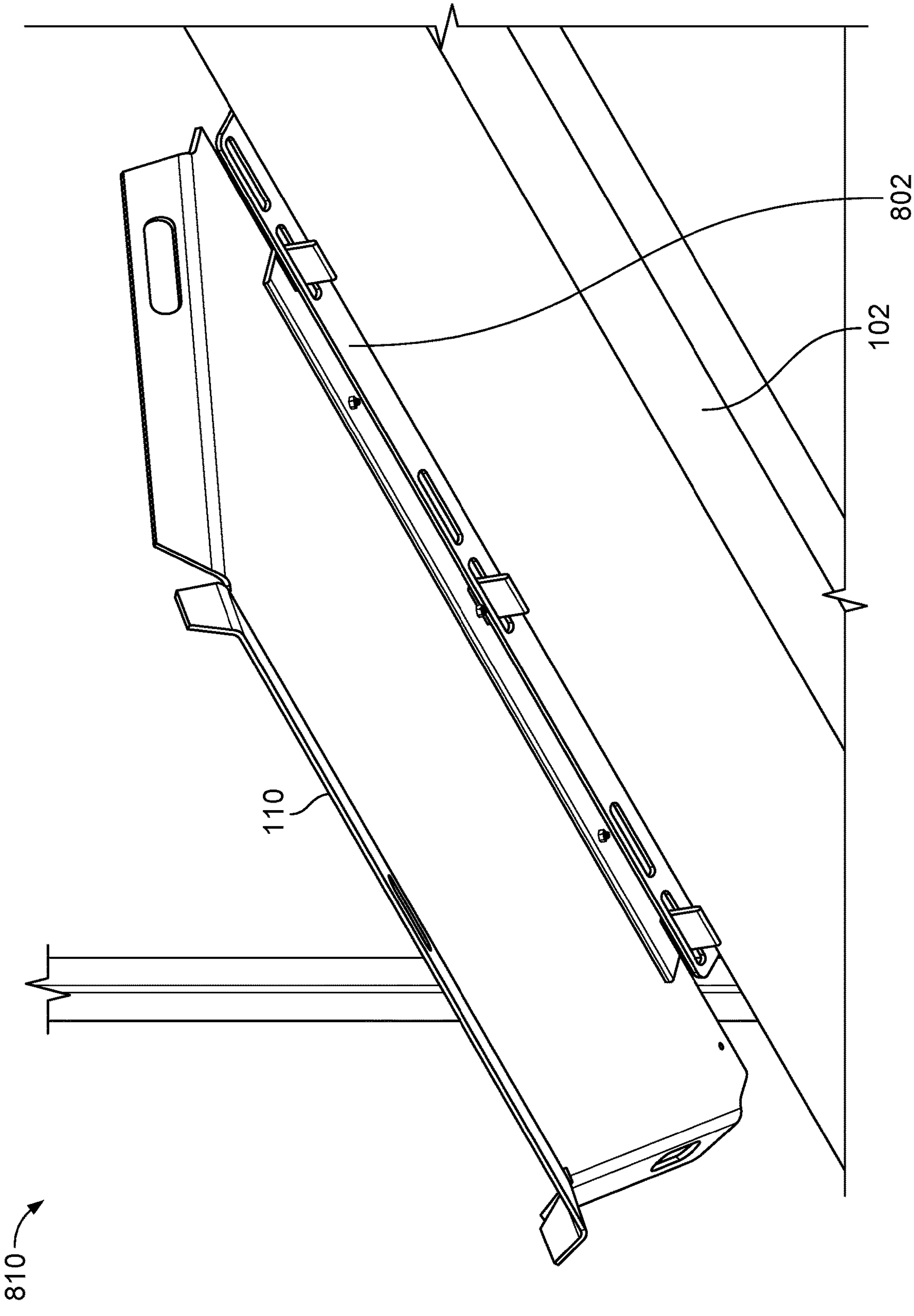
Figure 8C:
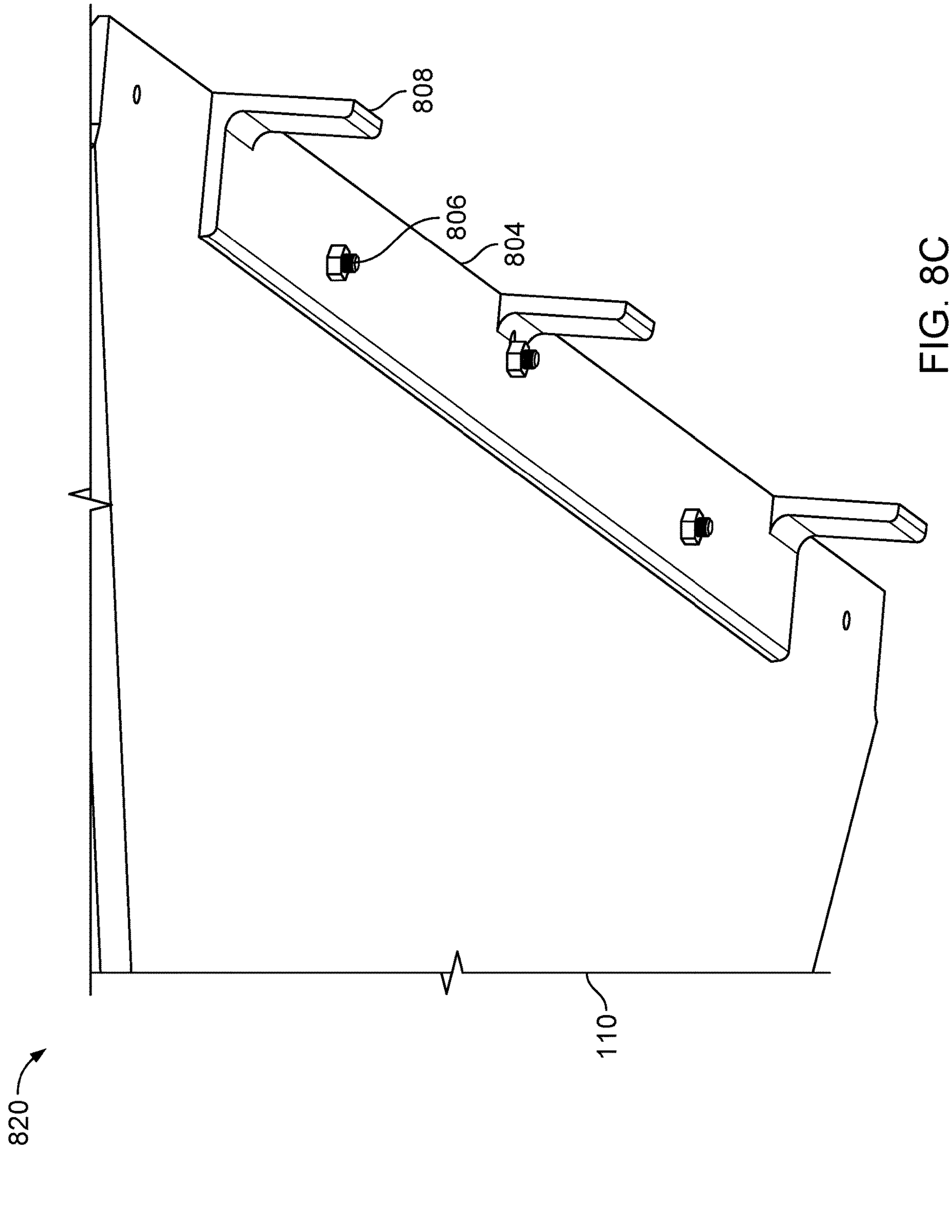
Figure 8D:
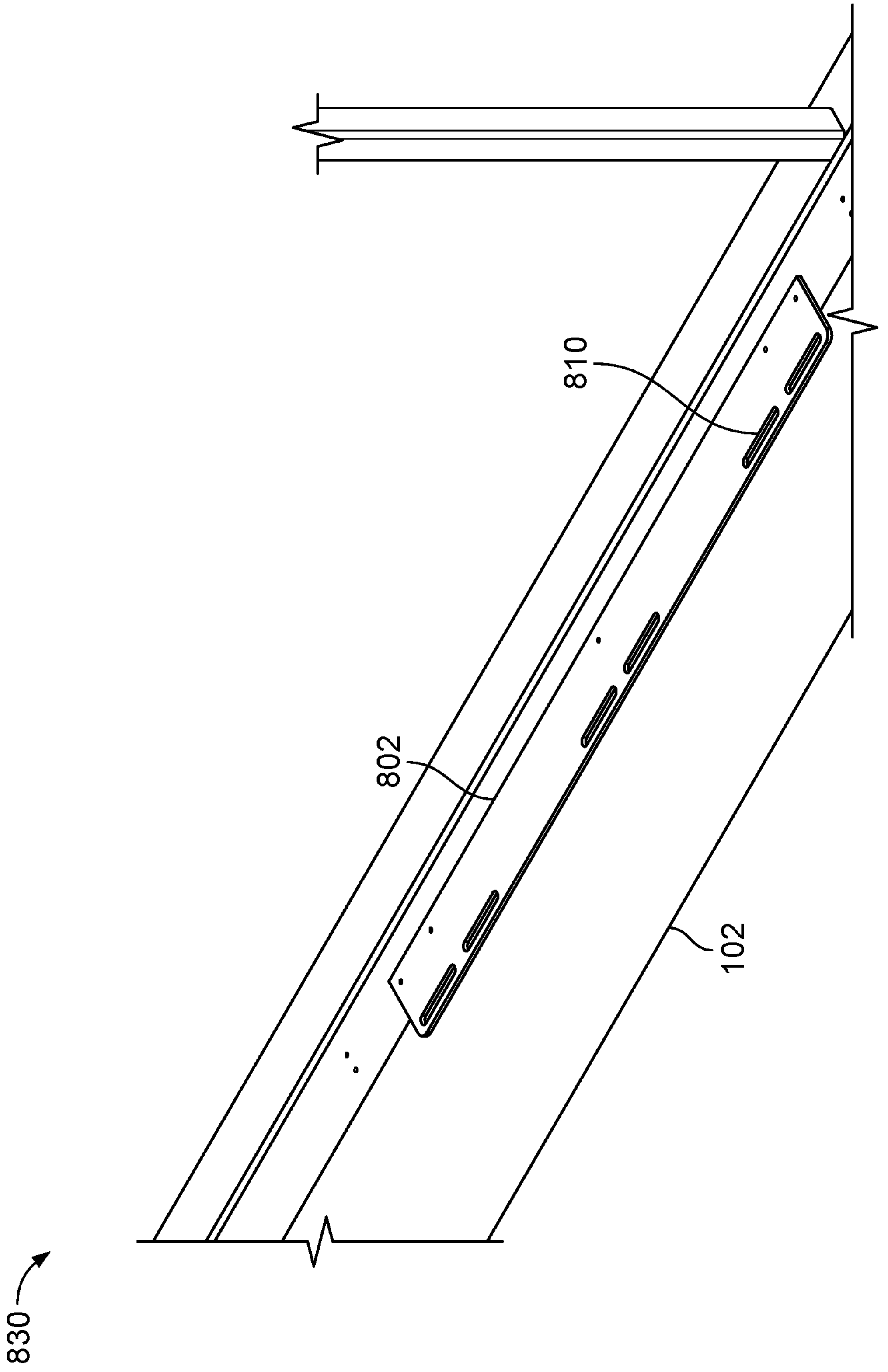

FIGS. 7A-7C depict diagrams 700, 710, 720 of an example mobile loading structure 702 utilizing the dock plate with a vehicle 704. As depicted in the figures, a substantial horizontal and vertical gap exists between the mobile loading structure 702 and vehicles 704. These gaps form falling and tripping hazards for personnel traveling between the mobile loading structure 702 and vehicles 704. Additionally, as depicted in the figures, personnel can be carrying objects that obscure their vision which increases the risk of falling or tripping. By utilizing a dock plate as described in this specification, for example dock plate 104, the risk of falling or tripping can be minimized. For example, even though a user's vision may be obscured by a package, they could feel the tapered side edges of platform 110 with their feet to alert them to the fact that they are nearing the platform 110 edge. Similarly, a user could feel the front edge of platform 110 with their feet to alert them to the fact that they are nearing the edge of mobile loading structure 702.

FIGS. 8A-8D depict diagrams 800, 810, 820, 830 of a second implementation of a dock plate 801. In diagrams 800 and 810 the dock plate 801 is shown mounted to a loading structure 102. In some implementations, the dock plate 801 is mounted to the loading structure 102 using a bracket 802 that includes a plurality of slots 810 configured to accept tabs 808 mounted to the dock plate platform 110. Dock plate 801 includes a tab mounting structure 804. Tab mounting structure 804 contains one or more tabs 808 or posts sized and shaped to engage with the slots 810 of bracket 802. For example, tab mounting structure 804 can be formed from a length of angle iron and notched along one side to form tabs 808. In some examples, the tab mounting structure 804 is mounted to the bottom of the platform 110 and spans a majority of the width of the platform 110. Tab mounting structure 804 can be attached to the dock plate platform 110 by one or more pieces of hardware 806. The tabs 808 have a rounded corner that, when mounted in the bracket 806, allows the platform to pivot about the corner. Thus, a user can adjust the height of the dock plate 801 to conform to the loading bay height of different shipping vehicles.

Figure 9:
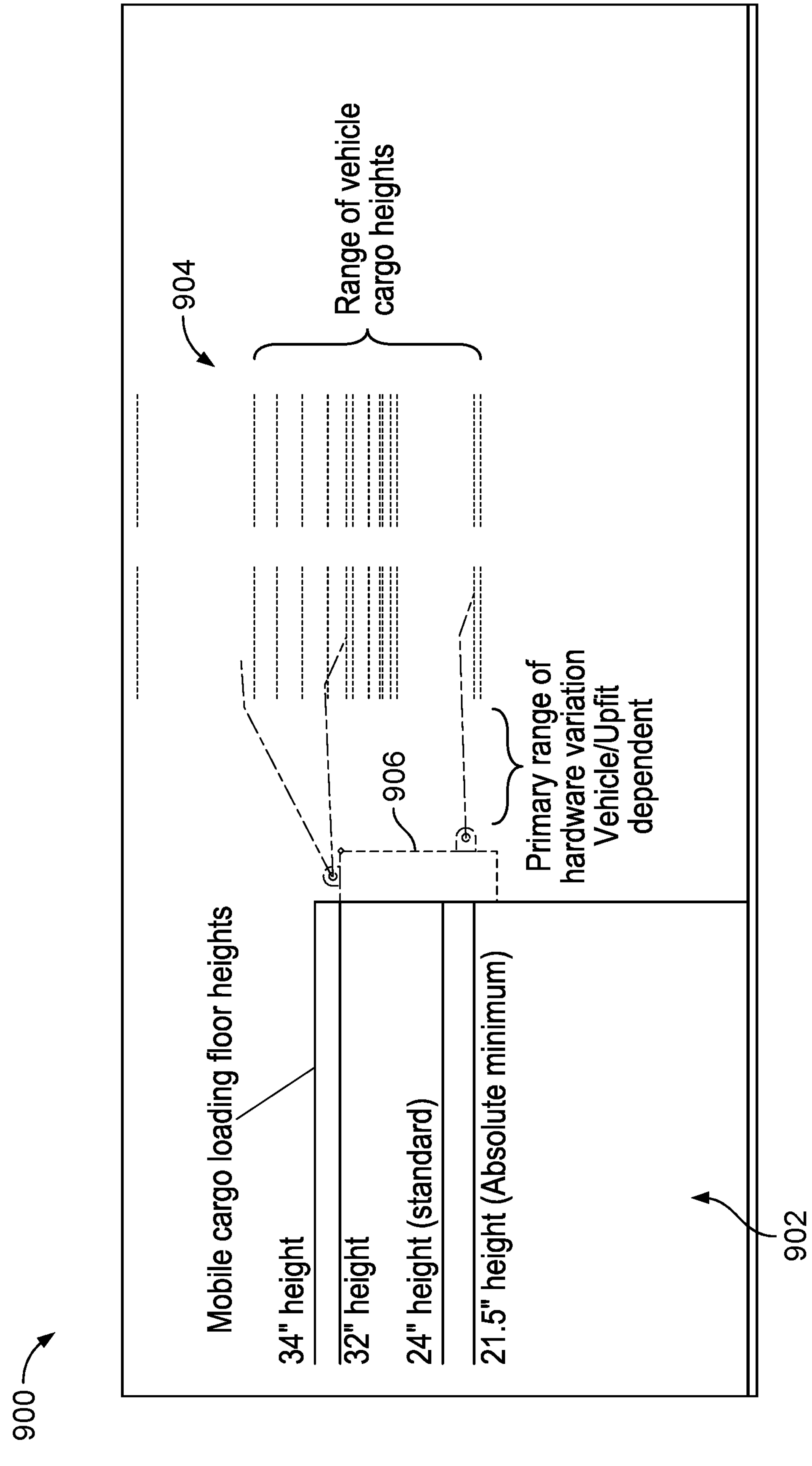
FIG. 9 is a schematic illustrating how the example dock plate can be configured to work with an example fleet of vehicles and loading structures.

FIG. 9 is a schematic 900 illustrating how the example dock plate can be configured to work with an example fleet of vehicles 904 and loading structures 902. In some implementations, the dock plate will be expected to be functional across a large range of applications. For example, a commercial shipping company may have a large range of vehicles 904 and loading structures 902 each with a different loading floor height. In this case, it may be beneficial to design the dock plate dimensions to achieve a "best fit" across the range of possible options, rather than any individual application. Multiple mounting points on the loading surface 906 may also be used to extend the range of vehicles and structures the dock plate is compatible with.

Figure 10:
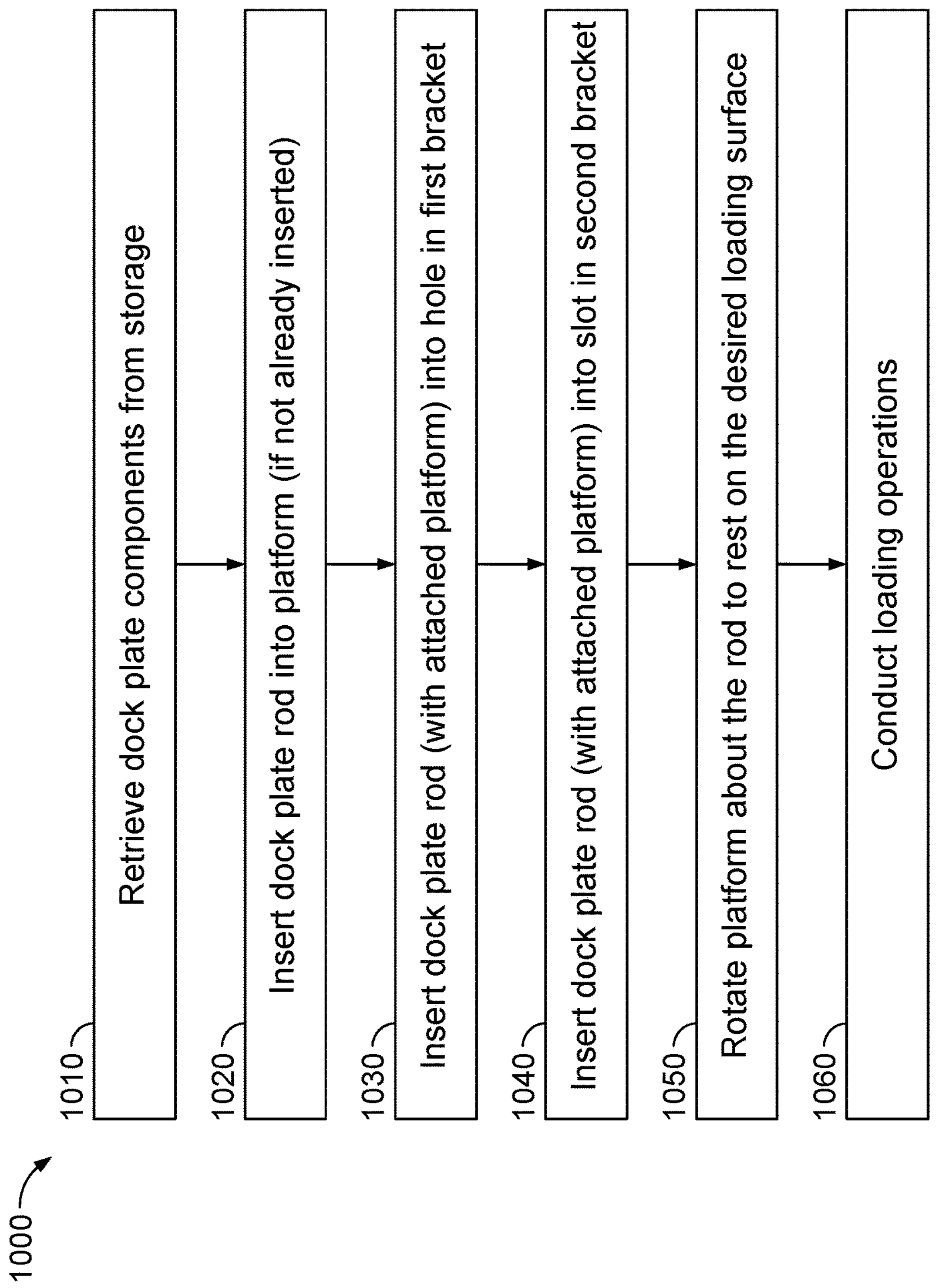
FIG. 10 is an example method for assembling a dock plate.
Figure 11:
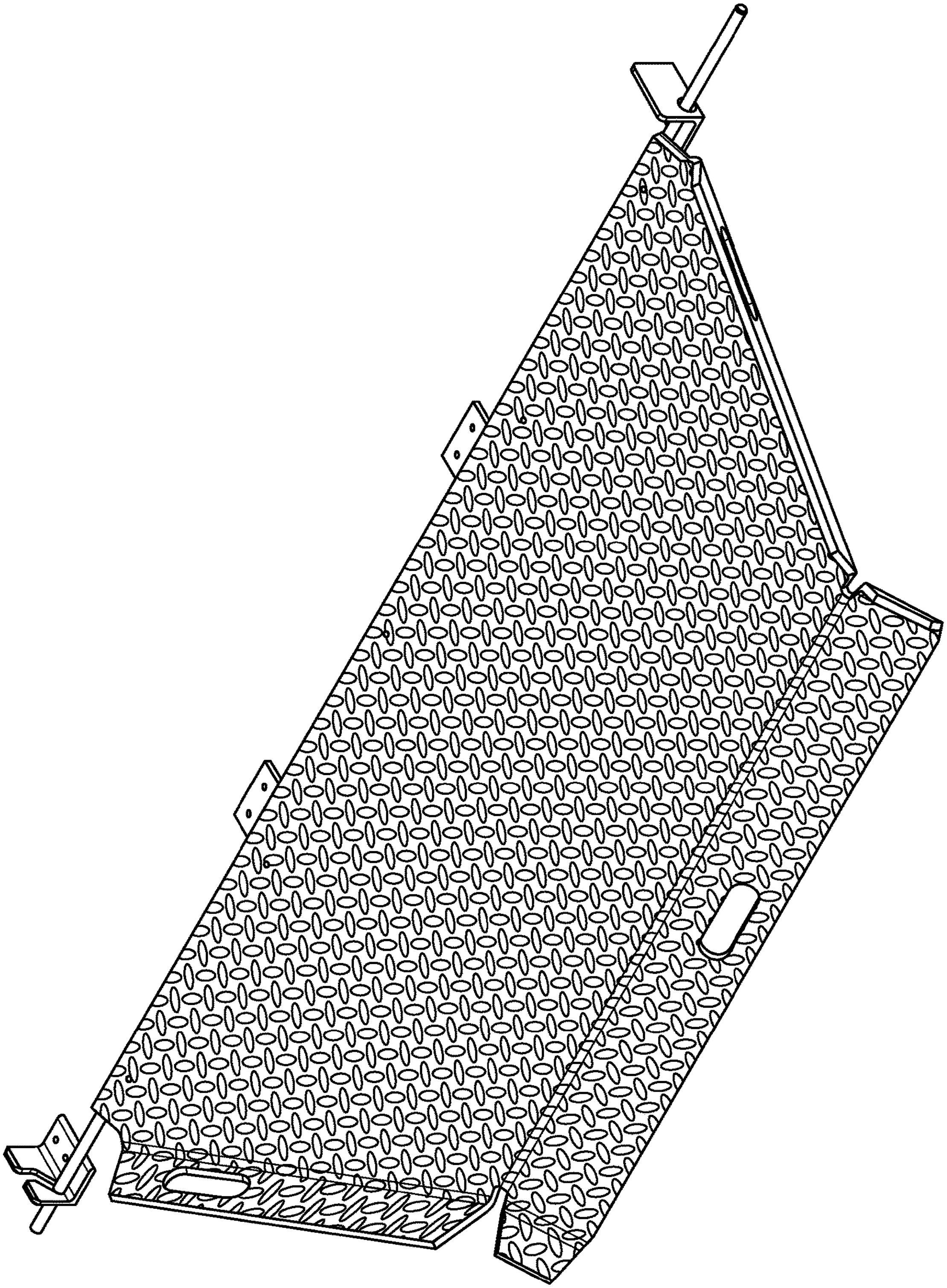
FIG. 11 is a front perspective view of the first implementation of the loading dock.
Figure 12:
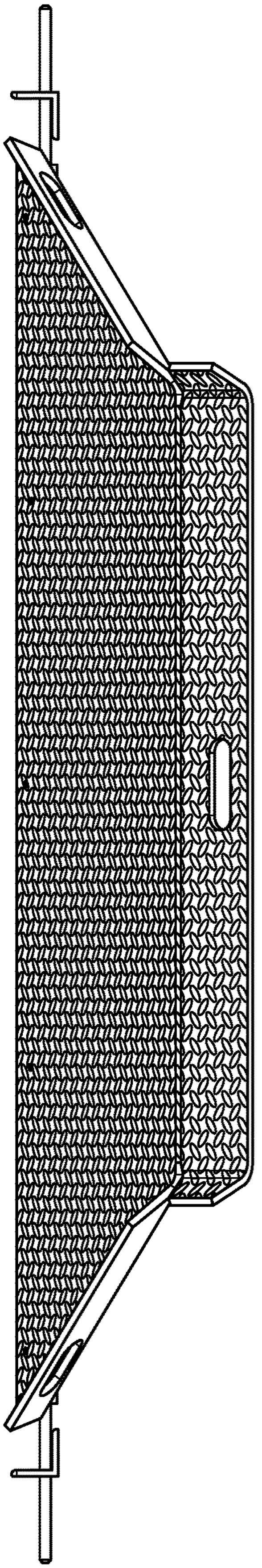
FIG. 12 is a front view of the first implementation of the loading dock.
Figure 13:
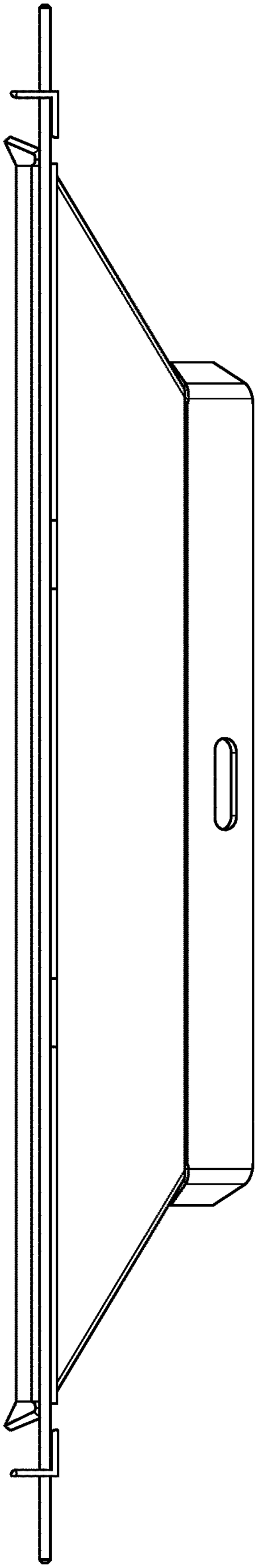
FIG. 13 is a back view of the first implementation of the loading dock.
Figure 15:
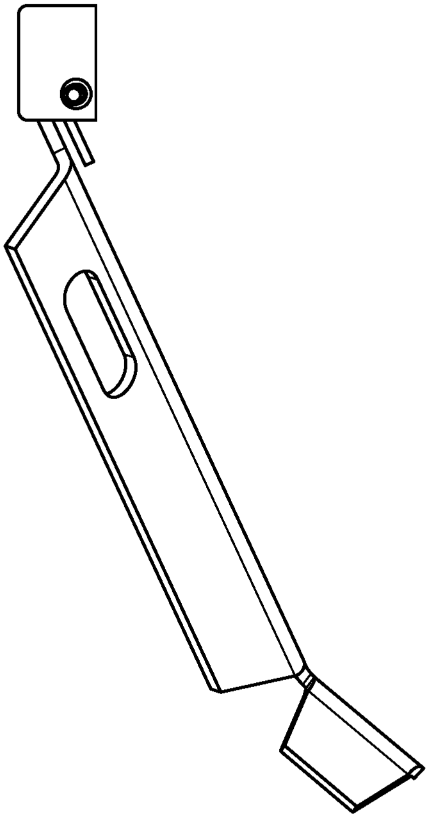
FIG. 15 is a left side view of the first implementation of the loading dock.
Figure 14:
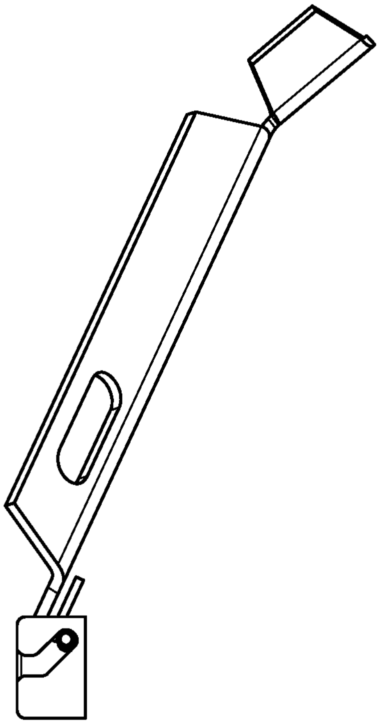
FIG. 14 is a right side view of the first implementation of the loading dock.
Figure 16:
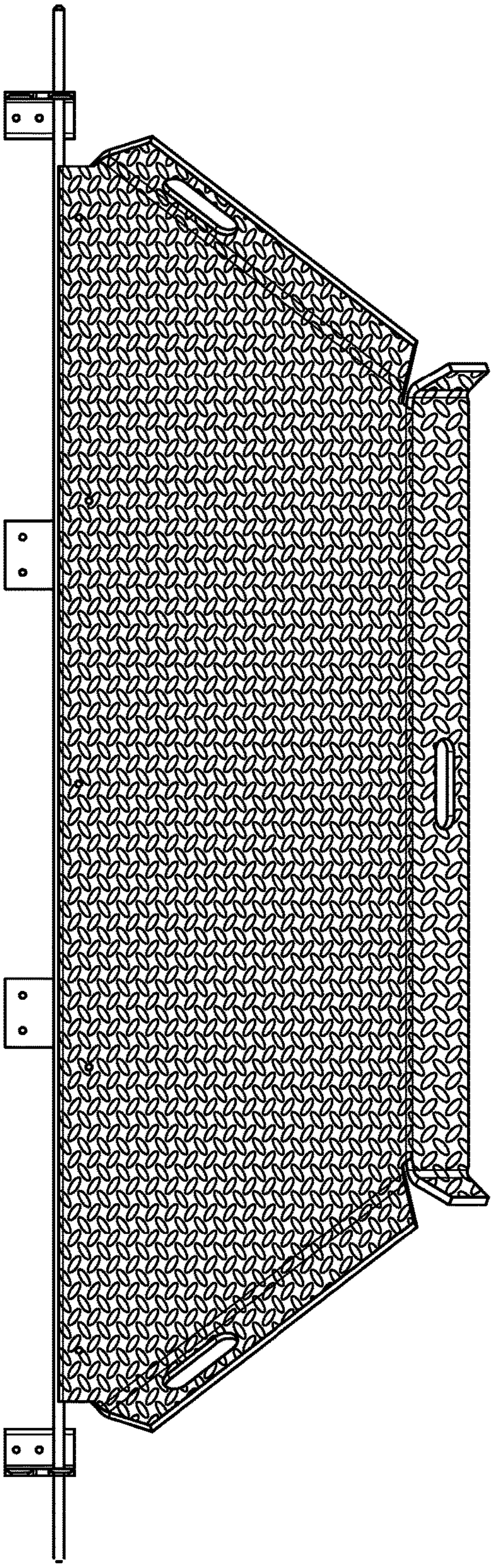
FIG. 16 is a top view of the first implementation of the loading dock.
Figure 17:
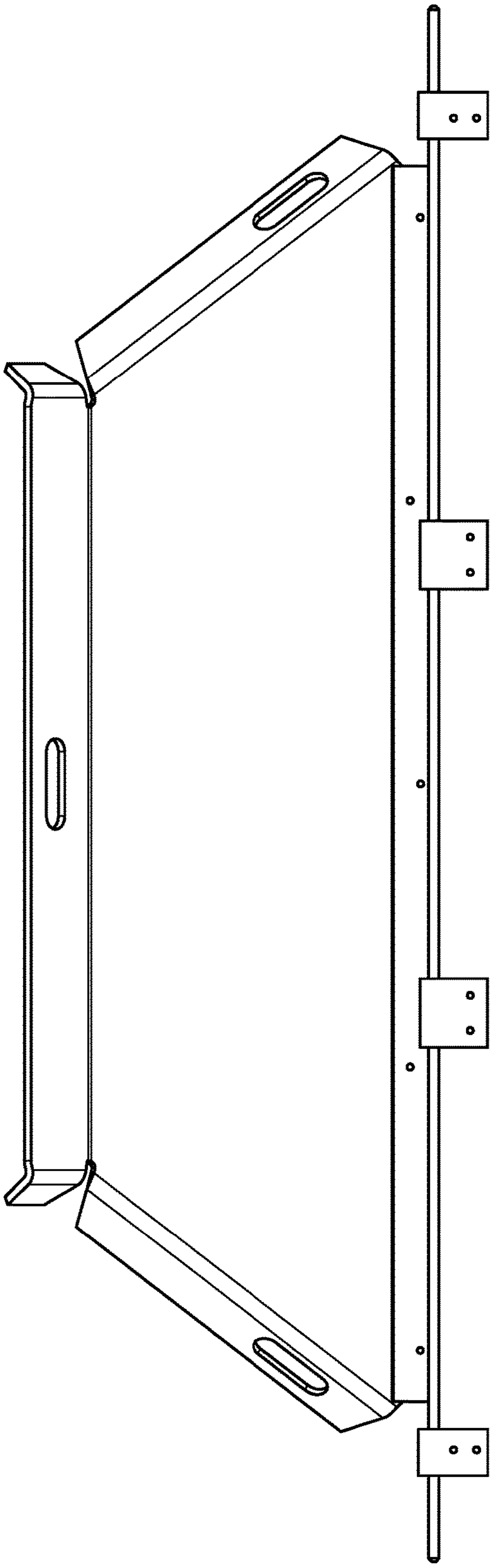
FIG. 17 is a bottom view of the first implementation of the loading dock.
Figure 18:
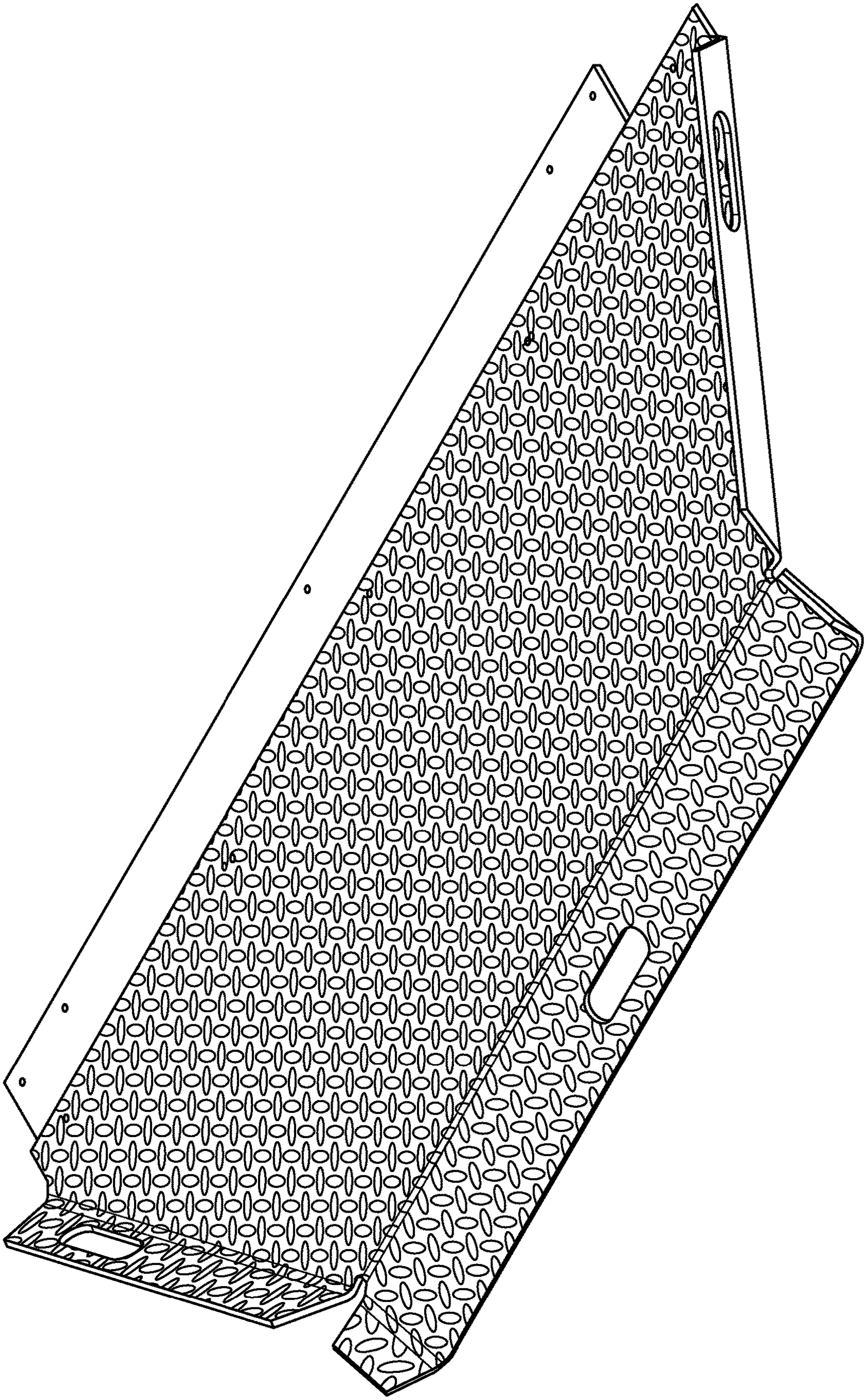
FIG. 18 is a front perspective view of the second implementation of the loading dock.
Figure 19:
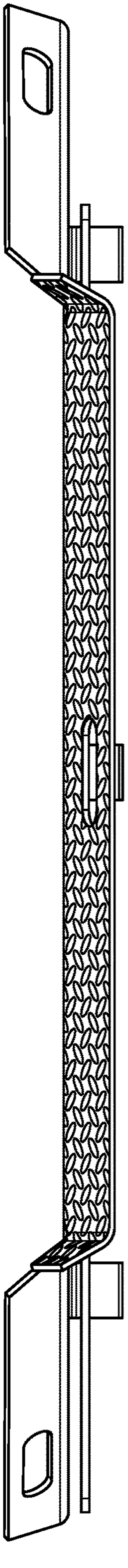
FIG. 19 is a front view of the second implementation of the loading dock.
Figure 20:
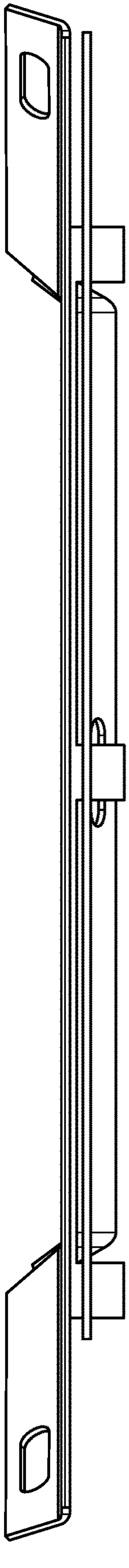
FIG. 20 is a back view of the second implementation of the loading dock.
Figure 22:
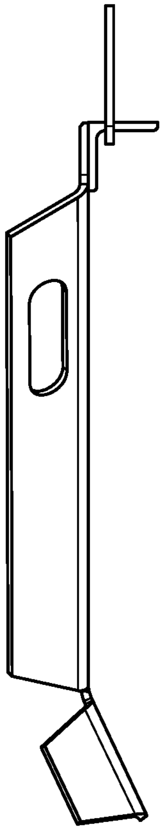
FIG. 22 is a left side view of the second implementation of the loading dock.
Figure 21:
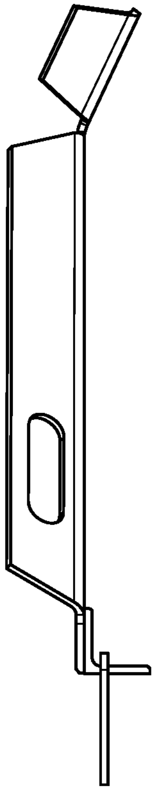
FIG. 21 is a right side view of the second implementation of the loading dock.
Figure 23:
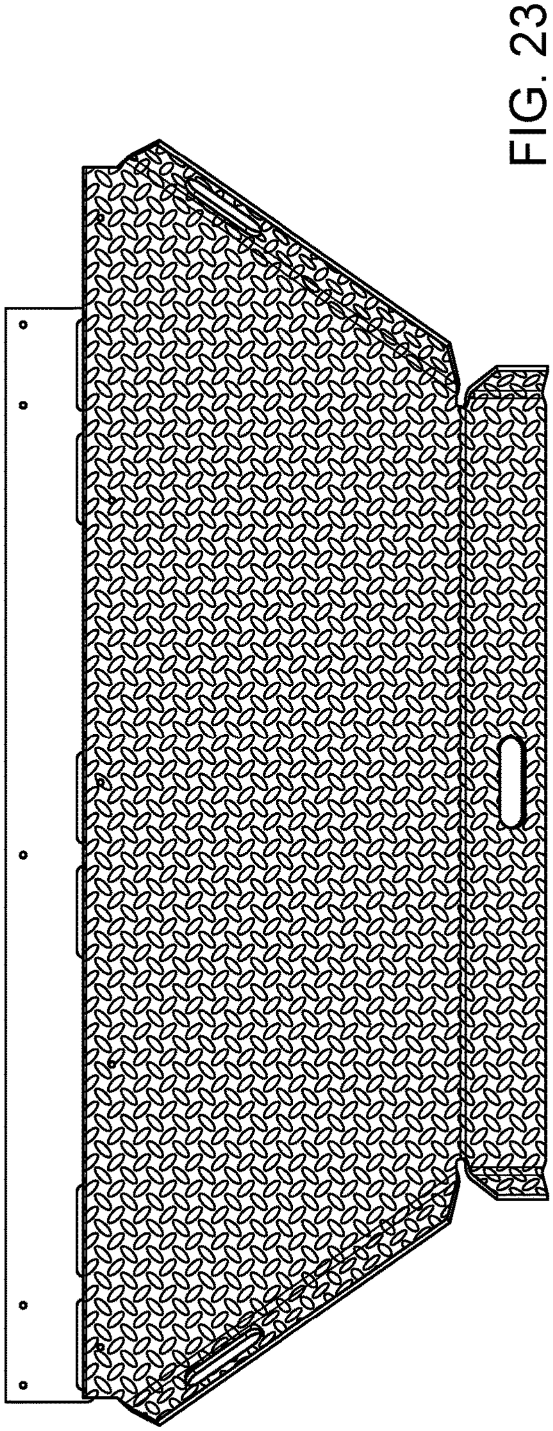
FIG. 23 is a top view of the second implementation of the loading dock.
Figure 24:
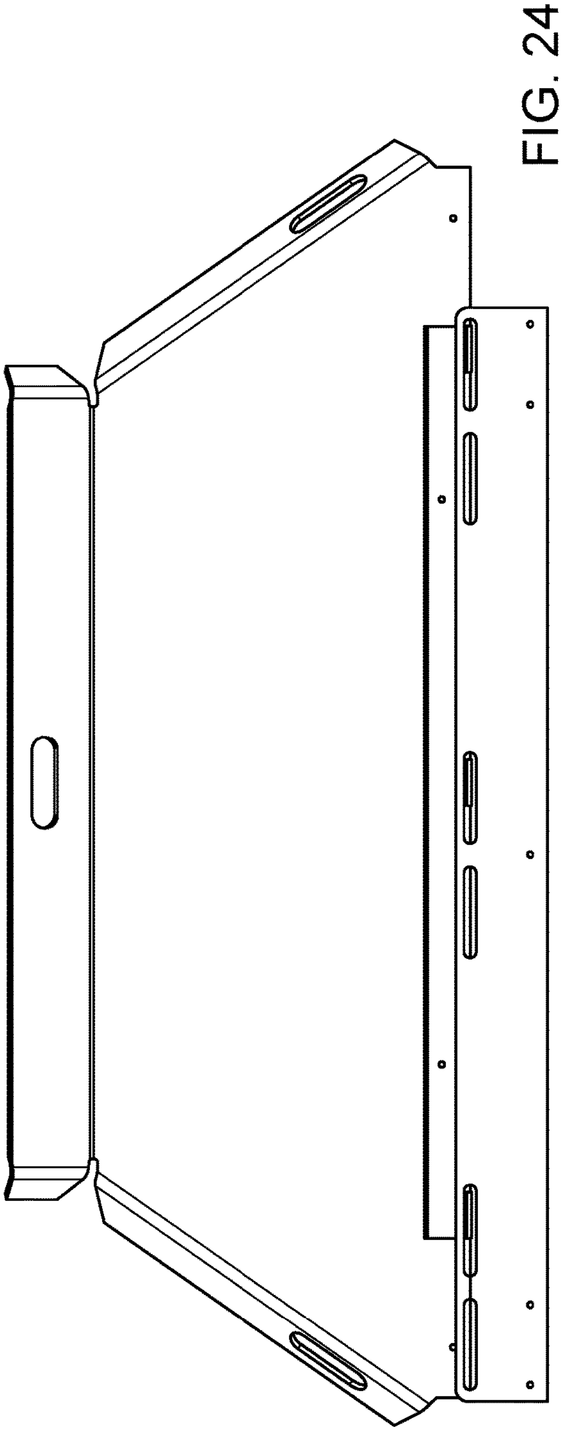
FIG. 24 is a bottom view of the second implementation of the loading dock.

FIG. 10 is an example method 1000 for assembling a dock plate. In some implementations, the dock plate may be stored in a vehicle prior to use. In this case, the dock plate must be stored in the vehicle in such a way that it does not become a hazard while the vehicle is in operation. Additionally, the storage of the dock plate in the vehicle must be done in such a way that it is compliant with the applicable laws if the vehicle is to be operated on a public road. In the case where the dock plate is stored in a vehicle or loading structure, the first step is to retrieve the dock plate components 1010. In implementations where the dock plate is already readily accessible, this step may be omitted.

In some implementations, following retrieval, the rod is then inserted into the dock plate platform 1020. In other implementations, the rod may already be attached to the dock plate platform, or may be integrated into the platform itself. In those cases, this step may be omitted.

In some implementations, following insertion of the rod into the dock plate platform, the rod is then inserted into the hole in the first bracket 1030. This step assumes that the necessary brackets have already been installed on the loading structure. While this method describes a first and second bracket, other bracket arrangements are possible. In the case of other bracket combinations, this method should be modified accordingly.

In some implementations, following insertion of the rod and platform into the first bracket hole, the rod and platform unit is then inserted into the slot in the second bracket 1040.

In some implementations, when the rod and platform have been inserted into both the first and second brackets, the platform may then be rotated about the rod to rest on the desired loading surface 1050. It should be noted that in the implementation where the rod is integral to the platform, the rod (and platform) may be rotating about the bracket. Additionally, in some implementations, this step may not be required. For example, in the case where the loading surface is already at the desired height when the dock plate is installed, no rotation of the platform may be desired. In that case, this step may be omitted.

In some implementations, following assembly of the dock plate, loading operations can then be commenced 1060.

What is claimed is:

1. A loading dock ramp system comprising:

a platform having a first end, a second end opposite the first end, a top surface, and a bottom surface, the platform comprising at least one rod attached to the bottom surface at the first end; and at least two sets of brackets mounted at different heights on a loading dock structure, wherein a first of the sets of brackets are mounted above and aligned with a second of the sets of brackets, each set of brackets comprising a first bracket and a second bracket, the first bracket comprising a first planar surface extending away from the loading dock structure and defining a hole, sized to accept the rod, through the first planar surface, the second bracket comprising a second planar surface extending away from the loading dock structure and defining a slot comprising an opening at an edge of the second planar surface, the slot sized to accept the rod such that the rod passes through the opening and rests at a bottom of the slot, wherein the second bracket comprises a reinforcement member, and wherein the bottom of the slot is closer to the reinforcement member than the opening is to the reinforcement member, and wherein the bottom of the slot is offset horizontally from the slot opening.

2. The system of claim 1, wherein the rod is a solid cylindrical rod extending across the first end of the platform and extending as far as or beyond opposite side edges of the platform.

3. The system of claim 1, wherein the at least one rod comprises:

a first rod extending partially along the first end of the platform and beyond a first side edge of the platform, and a second rod extending partially along the first end of the platform and beyond a second side edge of the platform opposite the first side edge.

4. The system of claim 1, wherein the loading dock structure is a mobile storage structure.

5. The system of claim 1, wherein the first bracket comprises a first base and the first planar surface extends outward from the first base, and wherein the second bracket comprises a second base and the second planar surface extends outward from the second base.

6. The system of claim 5, wherein the first bracket comprises a first reinforcement member along a side edge of the first planar surface, and wherein the second bracket comprises a second reinforcement member along a side edge of the second planar surface.

7. The system of claim 6, wherein the opening at the edge of the second planar surface is positioned facing away from the second reinforcement member.

8. The system of claim 6, wherein the slot is oriented such that the bottom of the slot is closer to the second reinforcement member than the opening is to the second reinforcement member.

9. The system of claim 1, wherein the top surface at the second end of the platform is angled downward.

10. The system of claim 1, wherein the top surface of the platform is angled upward along two sides extending between the first end and the second end.

11. The system of claim 1, wherein the slot is oriented such that the bottom of the slot is offset horizontally from the opening at the edge of the second planar surface.

12. The system of claim 1, wherein the rod is configured to engage with the first bracket and the second bracket such that the platform can pivot about the rod.

13. A loading dock ramp system comprising:

a platform having a first end, a second end opposite the first end, a top surface, and a bottom surface, the platform comprising at least one rod attached to the bottom surface at the first end; and at least two sets of brackets mounted at different heights on a loading dock structure, wherein a first of the sets of brackets are mounted above and aligned with a second of the sets of brackets, each set of brackets comprising a first bracket and a second bracket, the first bracket comprising a first planar surface extending away from a first base member and defining a hole, sized to accept the rod, through the first planar surface the second bracket comprising a second planar surface extending away from a second base member and defining a slot comprising an opening at an edge of the second planar surface, the slot sized to accept the rod such that the rod passes through the opening and rests at a bottom of the slot, wherein the first base member and the second base member are each configured for attachment to the loading dock structure, wherein the second bracket comprises a reinforcement member, and wherein the bottom of the slot is closer to the reinforcement member than the opening is to the reinforcement member, and wherein the bottom of the slot is offset horizontally from the slot opening.

14. The system of claim 13, wherein the first base member and the second base member each define a plurality of other holes each sized to accept a mechanical fastener.

15. The system of claim 13, wherein a loading dock plate apparatus of the loading dock structure can be installed without the use of tools.

16. The system of claim 13, wherein the rod is a solid cylindrical rod extending across the first end of the platform and extending as far as or beyond opposite side edges of the platform.

17. A cross-docking trailer with loading platform, comprising:

a plurality of doors along a sidewall of the trailer;

a container structure of the trailer comprising the sidewall;

at least two sets of brackets mounted to the container structure adjacent to at least one of the doors, wherein a first of the sets of brackets are mounted above and aligned with a second of the sets of brackets, each set of brackets comprising a first bracket and a second bracket; and a removable loading platform configured to be installed within the sets of brackets, the platform having a first end, a second end opposite the first end, a top surface, and a bottom surface, the platform comprising at least one rod, wherein the at least one rod comprises a solid cylindrical rod extending across the first end of the platform and extending as far as or beyond opposite side edges of the platform, wherein the platform further comprises:

one or more angled flanges alongside edges of the platform, and a first planar surface and a second planar surface formed by a bend in the platform, wherein the platform is tapered at the second end such that the top surface of the platform includes a trapezoidal shape with the first end being longer than the second end, and wherein the at least one rod is attached to the platform by a rod mounting structure comprising a mounting plate welded to the rod and one or more hardware mounting points attaching the mounting plate to the platform;

wherein, for each set of brackets:

the first bracket comprises:

a first base and a first planar surface extending away from the container structure and defining a hole, sized to accept the rod, through the first planar surface, and a first reinforcement member along a side edge of the first planar surface; and the second bracket comprises:

a second base, a second planar surface extending away from the container structure and defining a slot comprising an opening at an edge of the second planar surface, the slot sized to accept the rod such that the rod passes through the opening and rests at a bottom of the slot, and a second reinforcement member along a side edge of the second planar surface, wherein the slot comprises a channel of parallel sides with a cylindrical bottom resting area in which the rod is configured to sit, wherein the opening at the edge of the second planar surface is positioned facing away from the second reinforcement member, and wherein the bottom of the slot is closer to the second reinforcement member than the opening is to the second reinforcement member.

18. The cross-docking trailer of claim 17, wherein the loading platform comprises a tab mounting structure mounted to the bottom surface of the platform at the first end, the tab mounting structure comprises at least one angular tab sized and shaped to engage with the slot of the bracket.

19. The cross-docking trailer of claim 18, wherein the tab mounting structure is formed from a length of angle iron and notched along one side to form a plurality of angular tabs along a length of the tab mounting structure.

20. The cross-docking trailer of claim 17, wherein the loading platform includes angled flanges alongside edges of the platform.

* * * * *